(12) United States Patent
Combar et al.

(10) Patent No.: US 7,058,600 B1
(45) Date of Patent: Jun. 6, 2006

(54) INTEGRATED PROXY INTERFACE FOR WEB BASED DATA MANAGEMENT REPORTS

(75) Inventors: Curtis T. Combar, Woodland Park, CO (US); Carol Y. Devine, Colorado Springs, CO (US); William P. Flentje, Colorado Springs, CO (US); Robert A. Pfister, Colorado Springs, CO (US)

(73) Assignee: MCI, Inc., Ashburn, VA (US)

( * ) Notice: Subject to any disclaimer, the term of this patent is extended or adjusted under 35 U.S.C. 154(b) by 464 days.

(21) Appl. No.: 09/159,404

(22) Filed: Sep. 24, 1998

Related U.S. Application Data

(60) Provisional application No. 60/060,655, filed on Sep. 26, 1997.

(51) Int. Cl.
    G06F 17/60    (2006.01)
    H04K 1/00     (2006.01)
    H04L 9/00     (2006.01)

(52) U.S. Cl. ............. 705/34; 705/40; 379/114.03; 379/114.04; 379/114.28; 379/114.29; 707/9; 707/10; 709/223; 709/224; 709/226

(58) Field of Classification Search ............... 705/34, 705/40; 379/114.03, 114.28, 114.29, 121.04, 379/126, 114.04; 707/9, 10; 709/223–226
    See application file for complete search history.

(56) References Cited

U.S. PATENT DOCUMENTS

| | | | |
|---|---|---|---|
| 4,823,373 A | 4/1989 | Takahashi et al. | 379/58 |
| 4,893,248 A | 1/1990 | Pitts et al. | |
| 5,131,020 A | 7/1992 | Liebesny et al. | |
| 5,136,707 A | 8/1992 | Block et al. | 395/600 |
| 5,223,699 A | 6/1993 | Flynn et al. | 235/380 |
| 5,262,760 A | 11/1993 | Iwamura et al. | 345/145 |
| 5,313,598 A | 5/1994 | Yamakawa | 395/375 |
| 5,361,259 A | 11/1994 | Hunt et al. | 370/84 |
| 5,452,446 A | 9/1995 | Johnson | |
| 5,475,836 A | 12/1995 | Harris et al. | |
| 5,481,542 A | 1/1996 | Logston et al. | |
| 5,483,596 A | 1/1996 | Rosenow et al. | |
| 5,491,779 A | 2/1996 | Bezjian | |
| 5,506,893 A | 4/1996 | Buscher et al. | 379/115.02 |
| 5,530,744 A | 6/1996 | Charalambous et al. | |
| 5,533,108 A | 7/1996 | Harris et al. | 379/93 |
| 5,539,734 A | 7/1996 | Burwell et al. | 370/60 |

(Continued)

FOREIGN PATENT DOCUMENTS

JP        09064870 A       3/1997

(Continued)

OTHER PUBLICATIONS

Anonymous, "Call Accounting Products", Teleconnect, vol. 15, No. 3, p. 89, Mar. 1997.*

(Continued)

*Primary Examiner*—Kambiz Abdi

(57) ABSTRACT

An Intranet/Internet/Web-based data management tool that provides a common GUI enabling the requesting, customizing, scheduling and viewing of various types of unpriced call detail data reports pertaining to a customer's telecommunications network traffic. The Intranet/Internet/Web-based reporting system tool comprises a novel Web-based, client-server application that enables customers to access their own relevant data information timely, rapidly and accurately through a client GUI. A traffic view server is provided that enables periodic acquisition of data from the customer's telecommunications network at a user-specified frequency and configured to meet real-time traffic reporting requirements. The system infrastructure provided enables secure initiation, acquisition, and presentation of unpriced call detail and statistical data reports to customers.

19 Claims, 17 Drawing Sheets

U.S. PATENT DOCUMENTS

| | | | |
|---|---|---|---|
| 5,548,726 A | 8/1996 | Pettus | |
| 5,555,290 A | 9/1996 | McLeod et al. | 379/67 |
| 5,566,351 A | 10/1996 | Crittenden et al. | 395/867 |
| 5,586,260 A | 12/1996 | Hu | 395/200.2 |
| 5,602,918 A | 2/1997 | Chen et al. | |
| 5,621,727 A | 4/1997 | Vaudreuil | |
| 5,623,601 A | 4/1997 | Vu | |
| 5,649,182 A | 7/1997 | Reitz | |
| 5,650,994 A | 7/1997 | Daley | |
| 5,659,601 A | 8/1997 | Cheslog | 455/406 |
| 5,666,481 A | 9/1997 | Lewis | |
| 5,671,354 A | 9/1997 | Ito et al. | |
| 5,689,645 A | 11/1997 | Schettler et al. | |
| 5,692,030 A | 11/1997 | Teglovic et al. | |
| 5,692,181 A | 11/1997 | Anand et al. | |
| 5,694,546 A | 12/1997 | Reisman | 395/200.9 |
| 5,696,906 A | 12/1997 | Peters et al. | |
| 5,699,403 A | 12/1997 | Ronnen | |
| 5,706,502 A | 1/1998 | Foley et al. | |
| 5,708,780 A | 1/1998 | Levergood et al. | |
| 5,710,882 A | 1/1998 | Svennevik et al. | 395/200.12 |
| 5,721,908 A | 2/1998 | Lagarde et al. | |
| 5,721,913 A | 2/1998 | Ackroff et al. | |
| 5,727,129 A | 3/1998 | Barrett et al. | |
| 5,734,709 A | 3/1998 | DeWitt et al. | |
| 5,734,831 A | 3/1998 | Sanders | |
| 5,742,762 A | 4/1998 | Scholl et al. | |
| 5,742,763 A | 4/1998 | Jones | |
| 5,742,768 A | 4/1998 | Gennaro et al. | |
| 5,742,905 A | 4/1998 | Pepe et al. | |
| 5,745,754 A | 4/1998 | Lagarde et al. | |
| 5,754,830 A | 5/1998 | Butts et al. | |
| 5,757,900 A | 5/1998 | Nagel et al. | 379/207 |
| 5,764,756 A | 6/1998 | Onweller | |
| 5,768,501 A | 6/1998 | Lewis | |
| 5,774,660 A | 6/1998 | Brendel et al. | |
| 5,778,178 A | 7/1998 | Arunachalam | |
| 5,778,377 A | 7/1998 | Marlin et al. | |
| 5,781,550 A | 7/1998 | Templin et al. | |
| 5,781,632 A | 7/1998 | Odom | |
| 5,787,160 A | 7/1998 | Chaney et al. | |
| 5,790,780 A | 8/1998 | Brichta et al. | |
| 5,790,789 A | 8/1998 | Suarez | |
| 5,790,797 A | 8/1998 | Shimada et al. | |
| 5,793,694 A | 8/1998 | Akiba et al. | |
| 5,793,762 A | 8/1998 | Penners et al. | |
| 5,793,964 A | 8/1998 | Rogers et al. | |
| 5,796,393 A | 8/1998 | MacNaughton et al. | |
| 5,799,154 A | 8/1998 | Kuriyan | |
| 5,802,320 A | 9/1998 | Baehr et al. | |
| 5,805,803 A | 9/1998 | Birrell et al. | |
| 5,812,654 A | 9/1998 | Anderson et al. | |
| 5,812,750 A | 9/1998 | Dev et al. | 395/182.02 |
| 5,815,080 A | 9/1998 | Taguchi | |
| 5,815,665 A | 9/1998 | Teper et al. | |
| 5,819,225 A | 10/1998 | Eastwood et al. | |
| 5,819,271 A | 10/1998 | Mahoney et al. | |
| 5,825,890 A | 10/1998 | Elgamal et al. | 713/151 |
| 5,826,029 A | 10/1998 | Gore, Jr. et al. | |
| 5,826,269 A | 10/1998 | Hussey | |
| 5,832,519 A | 11/1998 | Bowen et al. | 707/203 |
| 5,835,084 A | 11/1998 | Bailey et al. | |
| 5,844,896 A | 12/1998 | Marks et al. | |
| 5,845,067 A | 12/1998 | Porter et al. | |
| 5,845,267 A | 12/1998 | Ronen | |
| 5,848,233 A | 12/1998 | Radia et al. | |
| 5,848,399 A | 12/1998 | Burke | |
| 5,850,517 A | 12/1998 | Verkler et al. | |
| 5,852,810 A | 12/1998 | Sotiroff et al. | |
| 5,852,812 A | 12/1998 | Reeder | |
| 5,862,325 A | 1/1999 | Reed et al. | |
| 5,867,495 A | 2/1999 | Elliott et al. | 370/352 |
| 5,875,236 A | 2/1999 | Jankowitz et al. | 379/114 |
| 5,875,296 A | 2/1999 | Shi et al. | |
| 5,881,237 A | 3/1999 | Schwaller et al. | |
| 5,883,948 A | 3/1999 | Dunn | 379/210 |
| 5,884,312 A | 3/1999 | Dustan et al. | 707/10 |
| 5,892,900 A | 4/1999 | Ginter et al. | |
| 5,923,756 A | 7/1999 | Shambroom | |
| 5,933,142 A | 8/1999 | LaStrange et al. | |
| 5,937,165 A | 8/1999 | Schwaller et al. | |
| 5,938,729 A | 8/1999 | Cote et al. | |
| 5,949,976 A | 9/1999 | Chappelle | |
| 5,953,389 A | 9/1999 | Pruett et al. | 379/9 |
| 5,956,714 A | 9/1999 | Condon | 707/8 |
| 5,960,411 A | 9/1999 | Hartman et al. | |
| 5,983,350 A | 11/1999 | Minear et al. | 713/201 |
| 5,987,134 A | 11/1999 | Shin et al. | |
| 5,991,746 A | 11/1999 | Wang | 705/40 |
| 5,999,525 A | 12/1999 | Krishnaswamy et al. | 370/352 |
| 5,999,965 A | 12/1999 | Kelly | 709/202 |
| 6,003,079 A | 12/1999 | Friedrich et al. | |
| 6,006,265 A | 12/1999 | Rangan et al. | |
| 6,012,090 A | 1/2000 | Chung et al. | |
| 6,018,768 A | 1/2000 | Ullman et al. | |
| 6,021,409 A | 2/2000 | Burrows | |
| 6,029,182 A | 2/2000 | Nehab et al. | |
| 6,041,357 A | 3/2000 | Kunzelman et al. | 709/228 |
| 6,044,362 A | 3/2000 | Neely | |
| 6,052,450 A | 4/2000 | Allison et al. | 379/127 |
| 6,058,170 A * | 5/2000 | Jagadish et al. | 379/114 |
| 6,065,002 A | 5/2000 | Knotts et al. | |
| 6,065,116 A | 5/2000 | Isaacson et al. | |
| 6,072,493 A | 6/2000 | Driskell et al. | 345/356 |
| 6,073,122 A | 6/2000 | Wool | |
| 6,084,953 A * | 7/2000 | Bardenheuer et al. | 379/114 |
| 6,088,451 A | 7/2000 | He et al. | 380/25 |
| 6,088,796 A | 7/2000 | Cianfrocca et al. | |
| 6,104,704 A * | 8/2000 | Buhler et al. | 379/114 |
| 6,104,716 A | 8/2000 | Crichton et al. | |
| 6,105,131 A | 8/2000 | Carroll | |
| 6,108,700 A | 8/2000 | Maccabee et al. | |
| 6,108,782 A | 8/2000 | Fletcher et al. | 713/153 |
| 6,112,238 A * | 8/2000 | Boyd et al. | 709/224 |
| 6,112,242 A | 8/2000 | Jois et al. | |
| 6,115,737 A | 9/2000 | Ely et al. | |
| 6,118,780 A | 9/2000 | Dunn et al. | |
| 6,122,258 A | 9/2000 | Brown | 370/256 |
| 6,128,624 A | 10/2000 | Papierniak et al. | |
| 6,130,933 A | 10/2000 | Miloslavsky | 379/90.01 |
| 6,131,116 A | 10/2000 | Riggins et al. | |
| 6,137,869 A | 10/2000 | Voit et al. | |
| 6,144,727 A | 11/2000 | Mashinsky | |
| 6,154,744 A | 11/2000 | Kenner et al. | 707/10 |
| 6,161,102 A | 12/2000 | Yanagihara et al. | 707/3 |
| 6,161,126 A | 12/2000 | Wies et al. | 709/203 |
| 6,161,128 A | 12/2000 | Smyk | |
| 6,163,597 A | 12/2000 | Voit | |
| 6,173,311 B1 | 1/2001 | Hassett et al. | 709/202 |
| 6,182,113 B1 | 1/2001 | Narayanaswami | |
| 6,205,456 B1 | 3/2001 | Nakao | 707/531 |
| 6,212,546 B1 | 4/2001 | Starkovich et al. | |
| 6,212,558 B1 | 4/2001 | Antur et al. | |
| 6,240,450 B1 * | 5/2001 | Sharples et al. | 709/224 |
| 6,253,239 B1 | 6/2001 | Shklar et al. | |
| 6,275,490 B1 | 8/2001 | Mattaway et al. | 370/352 |
| 6,286,050 B1 * | 9/2001 | Pullen et al. | 709/224 |
| 6,292,481 B1 | 9/2001 | Voit et al. | 370/352 |
| 6,295,551 B1 | 9/2001 | Roberts et al. | 709/205 |
| 6,337,858 B1 | 1/2002 | Petty et al. | 370/356 |
| 6,377,993 B1 * | 4/2002 | Brandt et al. | 709/227 |
| 6,715,080 B1 | 3/2004 | Starkovich et al. | |
| 6,760,844 B1 | 7/2004 | McCarthy et al. | |
| 6,782,425 B1 | 8/2004 | Germscheid et al. | |

| | | | |
|---|---|---|---|
| 2001/0001014 A1 | 5/2001 | Akins, III et al. | |
| 2001/0003828 A1 | 6/2001 | Peterson et al. | |
| 2004/0139178 A1 | 7/2004 | Mendez et al. | |

FOREIGN PATENT DOCUMENTS

| | | |
|---|---|---|
| WO | WO97/11443 | 3/1997 |
| WO | WO 97/16911 | 5/1997 |

OTHER PUBLICATIONS

Deixler, Lyle, "Call Accounting Update", Teleconnect, vol. 15, No. 10, p. 87, Oct. 1997.*

Deixler, Lyle, "Micro-Tel's Microcall for Windows 95/NT", Teleconnect, vol. 15, No. 12, p. 35, Dec. 1997.*

Chapman, D. Brent et al., "Building Internet Firewalls", Nov. 1995, O'Reilly & Associates, p. 58.

He, Taniguchi, "Internet Traffic Control and Management Architecture", IEEE, Oct. 22-24, 1998, pp. s46-03-1-s46-03-5.

Sixth International Conference on Network Protocols, IEEE, Technical Communication Services, Oct. 13-16, 1998, Table of Contents.

Markovich, Robert, "WAN Service Level Management Could Keep Your Feet Out of the Fire, Ensure Carriers Dilligence", Network World, Jul. 7, 1997.

Meteorology; Databases, "Inforonics offers controlled access to Web Meteorology", Information Today, Apr. 97, vol. 14 Issue 4, p53, 2p. This article reports that Inforonics has developed a controlled access gateway to MGA (Meteorological and Geoastrophysica).

Rosen,Michele, "BPCS steps into new millennium", Midrange Systems; Spring House; May 10, 1996. This article informs about the new release of BPCS Client/Server Software as the most extensive upgrade of the product since 1980s. It incorporates onject tech.

Inoue et al., "Secure Mobile IP Using Security Primitives", IEEE 1997.

Biggs, M., "Help for the Web enhances customer support, reduces help desk load" *Inforworld*, Jun. 16, 1997, v. 19, No. 24, pp. 82+.

Burch, B., "AT&T, MCI to release new management tools", *Network World*, Jan. 17, 1994, p. 19.

Low, C., "Integrating Communication Services", *IEEE Communication Magazine*, Jun. 1997, pp. 164-169.

"McAfee's New 'Self-Service' Help Desk Web Suite Makes PCs Help Desk-Ready" , Newswire Association Inc., Oct. 13, 1997.

Niemeter, R., "Using Web Technologies in Two MLS Environments: A Security Analysis." *IEEE*, pp. 205-214 1997.

Porter, T., "MCI offers tracking system: Direct Dispatch lets users eye problems remotely", *Service News*, Apr. 1994, p. 17.

Shklar, L., et al., "MetaMagic: Generating Virtual Web Sites Through Data Modeling," http://www.scope.gmd.de/info/www6/posters/714/poster714.html.

Vizard, M. et al., "MCI to Pilot Convergence Billing Service", *InfoWorld*, v. 18, Issue 37, Sep. 9, 1996.

Yager, T., "Mixed Messages", *UNIX Review*, v. 16, n. 2, p. 29, Feb. 1998.

"Carriers Improve Net Management Services", *Communications Week*, May 2, 1994, p. 74.

"Network management; new software platform enchances network management capabilities; MCI ServiceView offers greater cost savings, increased flexibility.", Product Announcement, *Edge*, Oct. 2, 1995, on & about AT&T, v. 10, n. 375, p. 11(1).

"New software platform enhances network management capabilities . . . ", *Business Wire*, Sep. 28, 1995 p. 9281122.

"User's Guide: Microsoft Access", Microsoft Corporation, 1994, pp. 378,594,599, 630-632 (13).

Jainschigg, J., "Billing confirmed: this easy-to-use box turns guest calls into revenue." *Teleconnect*, vol. 12, No. 9, p. 39(4).

"Cryptography and the Internet", www.echonyc.com/~ysue/crypt.html, 1995.

Lee et al., "Supporting Multi-User, Multi-Applet Workspaces in CBE", Computer Supported Cooperative Work 1996, Cambridge, MA.

"Netscape 2.0 Beta Hip or Hype?", www.plant.net.au/innovations/20beta.html, Planet Internet, 1995.

Quadri et al., Hewlett-Packard and Cisco Systems, "Internet Usage Platform" White Paper.

"HP and Cisco Deliver Internet Usage Platform and Billing and Analysis Solutions, New Platform and Solutions Allow ISPs and Carriers to Offer Value-added Services", Copyright 1998 Cisco Systems, Inc. http://www.cisco.com/warp/public/146/pressroom/1998/apr98/28.html.

HP Smart Internet, "Transform User Data Into Revenue", Copyright Hewlett-Packard Company, 1999.

HP Smart Internet Usage Analysis Solution, "Transform User Data Into Competitive Advantage", Copyright Hewlett-Packard Company, 1999.

HP/Cisco, Internet Usage Platform, "Transforming Internet Services Into Revenue" ©Hewlett-Packard Co. 1998.

"Release Note for Netflow FlowCollector Release 2.0," ©Jul. 1998 and "Release Notes for Netflow FlowAnalyzer Release 1.0" ©Sep. 1997.

HP Invent, "Capturing the Usage Billing Advantage", Copyright 1994-2001, Hewlett Packard http://www.hp.com/communications/usage/infolibrary/whitepapers/dsforum_print.html.

Kenney, Kathleen, "American Management Systems Launces Internet-Based Customer Care and Billing Tool for Telecom Firms", PR Newswire, New York, Oct. 9, 1996, extracted from http://proquest.umi.com on internet Feb. 28, 2002.

Morgan, Rick, "When Used Right, Internet can be Effective Marketing Tool", Madison Capital Times, Madison, WI, Nov. 8, 1996, extracted from http://proquest.umi.com on internet on Feb. 28, 2002.

Edwards, Morris, "The Electronic Commerce Juggernaut", Communication News, Nokomis, Sep. 1997, vol. 34, Issue 9, extracted from http://proquest.umi.com on Internet on Feb, 28, 2002.

Strom, D., "Control Everything", Network World, Aug. 20, 2001, 18, 34, pp. 39-41.

* cited by examiner

INTEGRATED PROXY INTERFACE FOR WEB BASED DATA MANAGEMENT REPORTS

CROSS-REFERENCE TO RELATED APPLICATIONS

The following patent application is based on and claims the benefit of U.S. Provisional Patent Application Ser. No. 60/060,655, filed Sep. 26, 1997.

FIELD OF THE INVENTION

The present invention relates generally to information delivery systems and, particularly, to a novel, World Wide Web/Internet-based, telecommunications network data management reporting and presentation service for customers of telecommunications service entities.

BACKGROUND OF THE INVENTION

Telecommunications service entities, e.g., MCI, AT&T, Sprint, and the like, presently provide for the presentation and dissemination of customer account and network data management information to their customers predominantly by enabling customers (clients) to directly dial-up, e.g., via a modem, to the entity's application servers to access their account information, or, alternatively, via dedicated communication lines, e.g., ISDN, T-1, etc., enabling account information requests to be initiated through their computer workstation running, for example, a Windows-based graphical user interface. The requests are processed by the entity's application servers, which retrieves the requested customer information, e.g., from one or more databases, processes and formats the information for downloading to the client's computer workstation.

Some types of data, e.g., "unpriced" call detail data pertains to a customer's telecommunications traffic, i.e., number usage. This type of data is provided in near real-time, and is used by network managers to make business decisions regarding their telecommunications networks. As an example, the assignee telecommunications carrier MCI Corporation provides an MCI ServiceView ("MSV") product line for its business customers which includes several client-server based data management applications. One of these applications, referred to as "TrafficView", provides network traffic analysis/monitor information as provided from an MCI TrafficView server. Particularly, with respect to MCI's TrafficView system, customers are provided with unpriced call detail data, e.g., relating to their toll free networks.

The current TrafficView architecture is organized primarily as a batch midrange-based server data delivery mechanism with the data being typically "canned" delivered at pre-determined times with predetermined formats. Additional trending, analysis, and data management functionality is maintained by the customers in workstation-based software provided to customers for installation at customer sites on their PCS.

While effective for its purpose, the current data management and presentation architecture are limited in that reports generated are of a narrow view, and are delivered at predetermined times with predetermined formats. These prior art reporting systems do not enable the generation of ad-hoc reports. Moreover, legacy platforms containing reporting data are reaching the architectural limits of scalability in terms of the total customers they can support, total online data they can present, total historical data they can keep and type and number of applications they can support. This simply is not sufficient for an increasing number of customers who, to remain competitive, are required to have updated and real-time access to their data to enable them to make their critical business decisions quicker. Moreover, there are a variety of independent data management tools and legacy reporting systems having disparate systems and infrastructures providing little or no cross application interoperability and data sharing, thus, requiring customers to use separate applications to gain access to their data.

It would thus be highly desirable to provide a data management product that is a Web-based (Internet and Intranet) client-server application for providing customers with information relating to their telecommunications network traffic and usage in a variety of detailed report formats.

It would additionally be highly desirable to provide a Web-based (Internet and Intranet) data management tool having a Web-based client-server application which provides expedient and secure data access and reporting services to customers in real-time, from any web browser on any computer workstation anywhere in the world.

SUMMARY OF THE INVENTION

The present invention is directed to a novel Intranet/Internet/Web-based data management system that provides a common GUI enabling the requesting, customizing, scheduling and viewing of various types of reports pertaining to customer's telecommunications network traffic, i.e., unpriced "traffic view" data. The Intranet/Internet/Web-based data management system comprises a Web-based, client-server application that enables customers to access their own relevant unpriced network traffic data information timely, rapidly and in a secure manner through the a client GUI. A client server application infrastructure enables processing, generation, and reporting of customer's real-time and rated inbound and outbound telecommunications traffic for network management, call center management and customer calling pattern analysis functions.

The system further employs a platform-independent, i.e., JAVA-based, network centric GUI client presentation layer and an objects/dispatcher/proxy layer access architecture.

Particularly, the telecommunications data management/system architecture is integrated with a novel Web/Internet-based reporting tool, referred to as "StarWRS", described in co-pending U.S. patent application Ser. No. 09/159,409, now U.S. Pat. No. 6,631,402.

The StarWRS web-based reporting tool comprises a layer functioning to enable customers to request reporting functionality across the Internet. This report request functionality includes routing requests to appropriate databases, e.g., real-time reporting requests will be satisfied by real-time database. Additionally, the interface provides customers with the ability to schedule and prioritize reports, format report request result sets, and provides for load balancing, report request validation, query generation and execution. Through a common GUI, customers are enabled to access their own unmetered network traffic data, i.e., usage analysis data.

In accordance with the principles of the present invention, there is provided a Web/Internet based reporting system for communicating call detail information relating to traffic pertaining to a customer's telecommunications network to a client workstation via an integrated interface comprising: a client browser application located at the client workstation for enabling interactive Web based communications with the reporting system, the client workstation identified with a customer and providing the integrated interface; at least one secure server for managing client sessions over the Internet, the secure server supporting a secure socket connection enabling encrypted communication between the browser application client and the secure server; a report manager server in communication with at least one secure server for maintaining an inventory of reporting items associated with a customer, the reporting items comprising report data types and report customization features for reports to be generated for the customer; a data retrieval device for retrieving customer specific data from the customer's telecommunications network at pre-determined times; and, a requester application enabling the customer to communicate a data report request message via the integrated interface to the report manager server, the request message comprising a metadata description of particular reporting items to be retrieved, the metadata description of particular reporting items being forwarded to the retrieval device, and the retrieval device obtaining customer specific data in accordance with the metadata request, whereby customer-specific retrieved data and the metadata description of the reporting items are communicated to the client workstation and utilized to generate a completed report for presentation to the customer.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings and in which.

DETAILED DESCRIPTION OF THE INVENTION

The present invention is one component of an integrated suite of customer network management and report applications using a Web browser paradigm. Known as the networkMCI Interact system ("nMCI Interact") such an integrated suite of Web-based applications provides an invaluable tool for enabling customers to manage their telecommunication assets, quickly and securely, from anywhere in the world.

As described in co-pending U.S. patent application Ser. No. 09/159,695, the nMCI Interact system architecture is basically organized as a set of common components comprising the following:

1) an object-oriented software architecture detailing the client and server based aspect of nMCI Interact;
2) a network architecture defining the physical network needed to satisfy the security and data volume requirements of the networkMCI System;
3) a data architecture detailing the application, back-end or legacy data sources available for networkMCI Interact; and
4) an infrastructure covering security, order entry, fulfillment, billing, self-monitoring, metrics and support.

Each of these common component areas will be generally discussed hereinbelow. A detailed descriptions of each of these components can be found in a related, co-pending U.S. patent application Ser. No. 09/159,695 entitled INTEGRATED CUSTOMER INTERFACE SYSTEM FOR COMMUNICATIONS NETWORK MANAGEMENT, the disclosure of which is incorporated herein by reference thereto.

Figure 1:
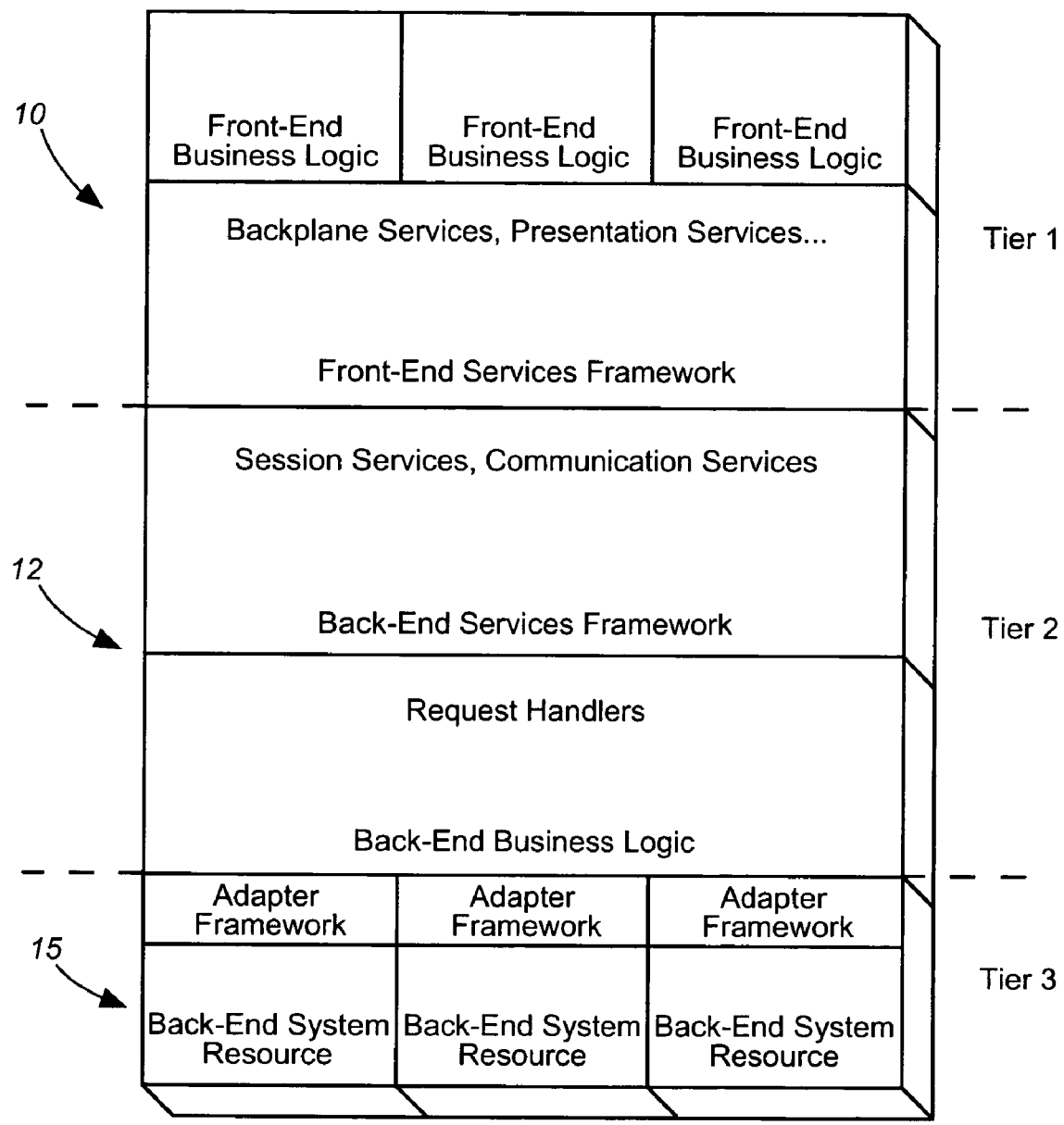
FIG. 1 illustrates the software architecture component comprising a three-tiered structure.

FIG. 1 is a diagrammatic illustration of the software architecture component in which the present invention functions. A first or client tier 10 of software services are resident on a customer work station 10 and provides customer access to the enterprise system, having one or more downloadable application objects directed to front end business logic, one or more backplane service objects for managing sessions, one or more presentation services objects for the presentation of customer options and customer requested data in a browser recognizable format and a customer supplied browser for presentation of customer options and data to the customer and for internet communications over the public Internet. Additionally applications are directed to front end services such as the presentation of data in the form of tables and charts, and data processing functions such as sorting and summarizing in a manner such that multiple programs are combined in a unified application suite.

A second or middle tier 12, is provided having secure web servers and back end services to provide applications that establish user sessions, govern user authentication and their entitlements, and communicate with adaptor programs to simplify the interchange of data across the network.

A third or back end tier 15 having applications directed to legacy back end services including database storage and retrieval systems and one or more database servers for accessing system resources from one or more legacy hosts.

Generally, as explained in U.S. patent application Ser. No. 09/159,515, now U.S. Pat. No. 6,115,040, entitled GRAPHICAL USER INTERFACE FOR WEB ENABLED APPLICATIONS, the disclosure of which is incorporated herein by reference thereto, the customer workstation includes client software capable of providing a platform-independent, browser-based, consistent user interface implementing objects programmed to provide a reusable and common GUI abstraction and problem-domain abstractions. More specifically, the client-tier software is created and distributed as a set of Java classes including the applet classes to provide an industrial strength, object-oriented environment over the Internet. Application-specific classes are designed to support the functionality and server interfaces for each application with the functionality delivered through the system being of two-types: 1) cross-product, for example, inbox and reporting functions, and 2) product specific, for example, toll free network management or Call Manager functions. The system is capable of delivering to customers the functionality appropriate to their product mix.

Figure 2:
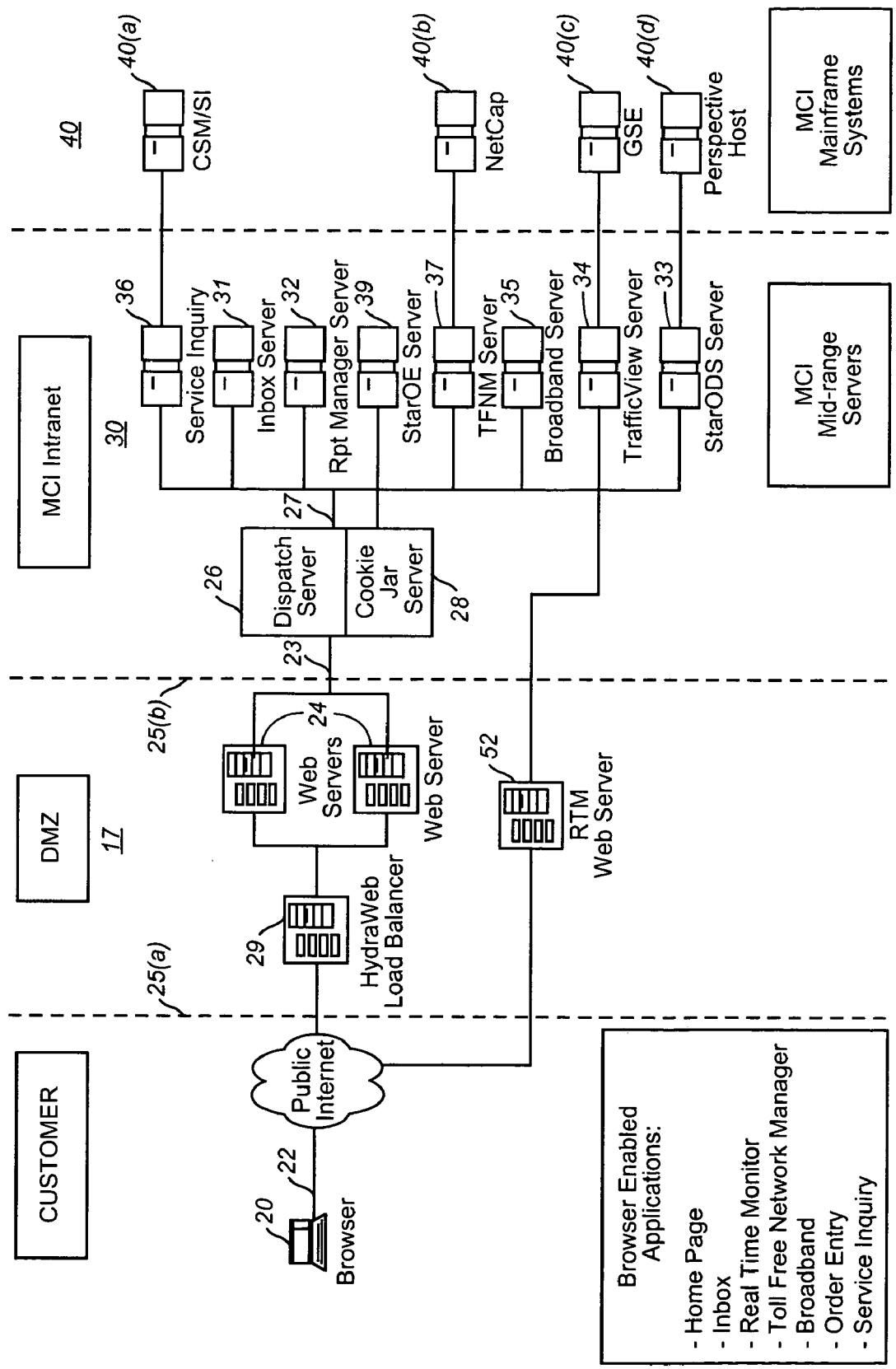
FIG. 2 is a diagrammatic overview of the software architecture of the networkMCI Interact system.

FIG. 2 is a diagrammatic overview of the software architecture of the networkMCI Interact system including: the Customer Browser (a.k.a. the Client) 20; the Demilitarized Zone (DMZ) 17 comprising a Web Servers cluster 24; the MCI Intranet Dispatcher Server 26; and the MCI Intranet Application servers 30, and the data warehouses, legacy systems, etc. 40.

Figure 3:
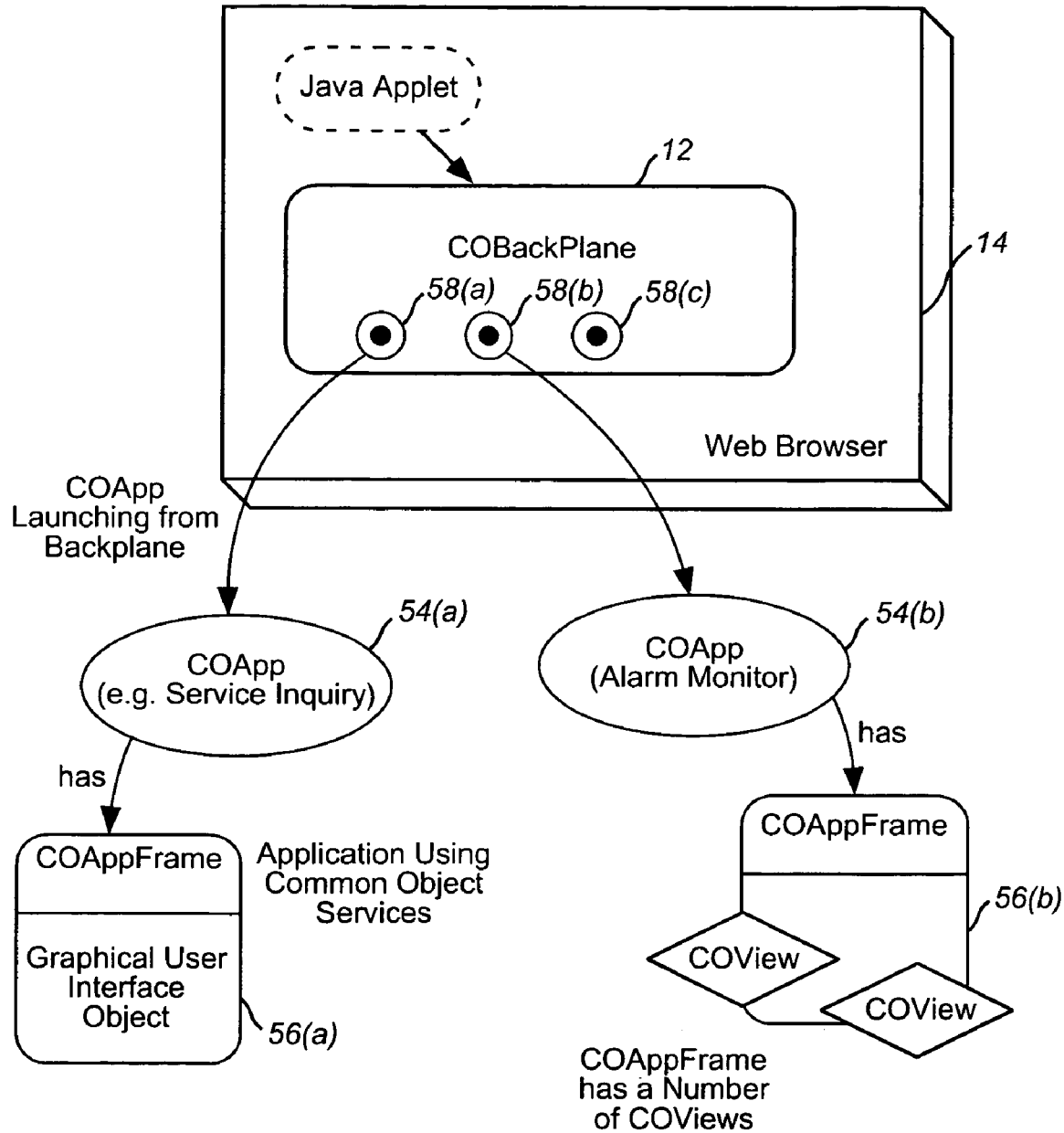
FIG. 3 is an illustrative example of a backplane architecture schematic.

The Customer Browser 20, is browser enabled and includes client applications responsible for presentation and front-end services. Its functions include providing a user interface to various MCI services and supporting communications with MCI's Intranet web server cluster 24. As illustrated in FIG. 3, and more specifically described in the above-mentioned, U.S. patent application Ser. No. 09/159, 515, now U.S. Pat. No. 6,115,040 entitled GRAPHICAL USER INTERFACE FOR WEB ENABLED APPLICATIONS, the client tier software is responsible for presentation services to the customer and generally includes a web browser 14 and additional object-oriented programs residing in the client workstation platform 20. The client software is generally organized into a component architecture with each component generally comprising a specific application, providing an area of functionality. The applications generally are integrated using a "backplane" services layer 12 which provides a set of services to the application objects which provide the front end business logic and manages their launch. The networkMCI Interact common set of objects provide a set of services to each of the applications such as: 1) session management; 2) application launch; 3) inter-application communications; 4) window navigation among applications; 5) log management; and 6) version management.

The primary common object services include: graphical user interface (GUI); communications; printing; user identity, authentication, and entitlements; data import and export; logging and statistics; error handling; and messaging services.

FIG. 3 is a diagrammatic example of a backplane architecture scheme illustrating the relationship among the common objects. In this example, the backplane services layer 12 is programmed as a Java applet which can be loaded and launched by the web browser 14. With reference to FIG. 3, a typical user session starts with a web browser 14 creating a backplane 12, after a successful logon. The backplane 12, inter alia, presents a user with an interface for networkMCI Interact application management. A typical user display provided by the backplane 12 may show a number of applications the user is entitled to run, each application represented by buttons depicted in FIG. 3 as buttons 58a,b,c selectable by the user. As illustrated in FIG. 3, upon selection of an application, the backplane 12 launches that specific application, for example, Service Inquiry 54a or Alarm Monitor 54b, by creating the application object. In processing its functions, each application in turn, may utilize common object services provided by the backplane 12. FIG. 3 shows graphical user interface objects 56a,b created and used by a respective application 54a,b for its own presentation purposes.

Figure 4:
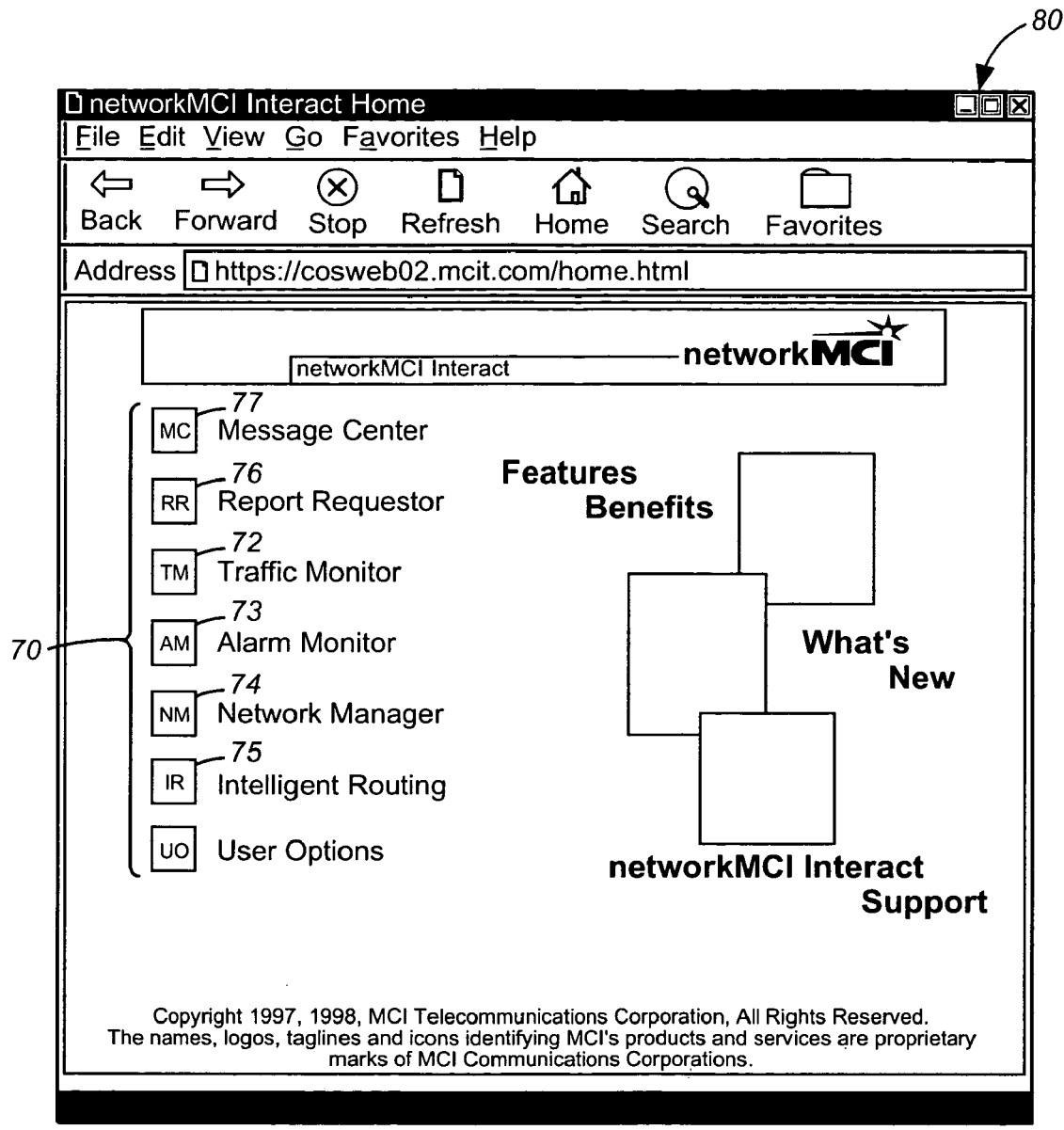
FIG. 4 illustrates an example client GUI presented to the client/customer as a browser web page.

FIG. 4 illustrates an example client GUI presented to the client/customer as a browser web page 80 providing, for example, a suite 70 of network management reporting applications including: MCI Traffic Monitor 72; an alarm monitor 73; a Network Manager 74 and Intelligent Routing 75. Access to network functionality is also provided through Report Requester 76, which provides a variety of detailed reports for the client/customer and a Message Center 77 for providing enhancements and functionality to traditional e-mail communications.

As shown in FIGS. 3 and 4, the browser resident GUI of the present invention implements a single object, COBackPlane which keeps track of all the client applications, and which has capabilities to start, stop, and provide references to any one of the client applications.

The backplane 12 and the client applications use a browser 14 such as the Microsoft Explorer versions 4.01 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm. and COAppFrame classes. COBackPlane 12 is an application backplane which launches the applications 54a, 54b, typically implemented as COApp. COBackPlane 12 is generally implemented as a Java applet and is launched by the Web browser 14. This backplane applet is responsible for launching and closing the COApps.

When the backplane is implemented as an applet, it overrides standard Applet methods init( ), start( ), stop( ) and run( ). In the init( ) method, the backplane applet obtains a COUser user context object. The COUser object holds information such as user profile, applications and their entitlements. The user's configuration and application entitlements provided in the COUser context are used to construct the application toolbar and Inbox applications. When an application toolbar icon is clicked, a particular COApp is launched by launchApp( ) method. The launched application then may use the backplane for inter-application communications, including retrieving Inbox data.

The COBackPlane 12 includes methods for providing a reference to a particular COApp, for interoperation. For example, the CoBackPlane class provides a getApp( ) method which returns references to application objects by name. Once retrieved in this manner, the application object's public interface may be used directly.

The use of a set of common objects for implementing the various functions provided by the system of the present invention, and particularly the use of browser based objects to launch applications and pass data therebetween is more fully described in the above-referenced, copending application GRAPHICAL USER INTERFACE FOR WEB ENABLED APPLICATIONS.

As shown in FIG. 2, the aforesaid objects will communicate the data by establishing a secure TCP messaging session with one of the DMZ networkMCI Interact Web servers 24 via an Internet secure communications path 22 established, preferably, with a secure sockets SSL version of HTTPS. The DMZ networkMCI Interact Web servers 24 function to decrypt the client message, preferably via the SSL implementation, and unwrap the session key and verify the users session. After establishing that the request has come from a valid user and mapping the request to its associated session, the DMZ Web servers 24 will re-encrypt the request using symmetric encryption and forward it over a second connection 23 to the dispatch server 26 inside the enterprise Intranet.

As described in greater detail in co-pending U.S. patent application Ser. No. 09/159,514, now U.S. Pat. No. 6,598, 167, entitled SECURE CUSTOMER INTERFACE FOR WEB-BASED DATA MANAGEMENT, the contents and disclosure of which is incorporated by reference as if fully set forth herein, a networkMCI Interact session is designated by a logon, successful authentication, followed by use of server resources, and logoff. However, the world-wide web communications protocol uses HTTP, a stateless protocol, each HTTP request and reply is a separate TCP/IP connection, completely independent of all previous or future connections between the same server and client. The nMCI Interact system is implemented with a secure version of HTTP such as S-HTTP or HTTPS, and preferably utilizes the SSL implementation of HTTPS. The preferred embodiment uses SSL which provides a cipher spec message which provides server authentication during a session. The preferred embodiment further associates a given HTTPS request with a logical session which is initiated and tracked by a "cookie jar server" 28 to generate a "cookie" which is a unique server-generated key that is sent to the client along with each reply to a HTTPS request. The client holds the cookie and returns it to the server as part of each subsequent HTTPS request. As desired, either the Web servers 24, the cookie jar server 28 or the Dispatch Server 26, may maintain the "cookie jar" to map these keys to the associated session. A separate cookie jar server 28, as illustrated in FIG. 2 has been found desirable to minimize the load on the dispatch server 26. This form of session management also functions as an authentication of each HTTPS request, adding an additional level of security to the overall process.

As illustrated in FIG. 2, after one of the DMZ Web servers 24 decrypts and verifies the user session, it forwards the message through a firewall 25b over a TCP/IP connection 23 to the dispatch server 26 on a new TCP socket while the original socket 22 from the browser is blocking, waiting for a response. The dispatch server 26 will unwrap an outer protocol layer of the message from the DMZ services cluster 24, and will reencrypt the message with symmetric encryption and forward the message to an appropriate application proxy via a third TCP/IP socket 27. While waiting for the proxy response all three of the sockets 22, 23, 27 will be blocking on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 26 from StarOE server 49 at logon time and cached.

If the requestor is authorized to communicate with the target service, the message is forwarded to the desired service's proxy. Each application proxy is an application specific daemon which resides on a specific Intranet server, shown in FIG. 2 as a suite of mid-range servers 30. Each Intranet application server of suite 30 is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting service are acting as clients to the application servers providing the service. Such mechanism increases the security of the overall system as well as reducing the number of interfaces.

The network architecture of FIG. 2 may also include a variety of application specific proxies having associated Intranet application servers including: a StarOE proxy for the StarOE application server 39 for handling authentication order entry/billing; an Inbox proxy for the Inbox application server 31, which functions as a container for completed reports, call detail data and marketing news messages, a Report Manager Proxy capable of communicating with a system-specific Report Manager server 32 for generating, managing and scheduling the transmission of customized reports including, for example: call usage analysis information provided from the StarODS server 33; network traffic analysis/monitor information provided from the Traffic view server 34; virtual data network alarms and performance reports provided by Broadband server 35; trouble tickets for switching, transmission and traffic faults provided by Service Inquiry server 36; and toll free routing information provided by Toll Free Network Manager server 37.

As partially shown in FIG. 2, it is understood that each Intranet server of suite 30 communicates with one or several consolidated network databases which include each customer's network management information and data. In the present invention the Services Inquiry server 36 includes communication with MCI's Customer Service Management legacy platform 40(*a*). Such network management and customer network data is additionally accessible by authorized MCI management personnel. As shown in FIG. 2, other legacy platforms 40(*b*), 40(*c*) and 40(*d*) may also communicate individually with the Intranet servers for servicing specific transactions initiated at the client browser. The illustrated legacy platforms 40(*a*)–(*d*) are illustrative only and it is understood other legacy platforms may be interpreted into the network architecture illustrated in FIG. 2 through an intermediate midrange server 30.

Each of the individual proxies may be maintained on the dispatch server 26, the related application server, or a separate proxy server situated between the dispatch server 26 and the midrange server 30. The relevant proxy waits for requests from an application client running on the customer's workstation 10 and then services the request, either by handling them internally or forwarding them to its associated Intranet application server 30. The proxies additionally receive appropriate responses back from an Intranet application server 30. Any data returned from the Intranet application server 30 is translated back to client format, and returned over the internet to the client workstation 10 via the Dispatch Server 26 and at one of the web servers in the DMZ Services cluster 24 and a secure sockets connection. When the resultant response header and trailing application specific data are sent back to the client browser from the proxy, the messages will cascade all the way back to the browser 14 in real time, limited only by the transmission latency speed of the network.

The networkMCI Interact middle tier software includes a communications component offering three (3) types of data transport mechanisms: 1) Synchronous; 2) Asynchronous;

and 3) Bulk transfer. Synchronous transaction is used for situations in which data will be returned by the application server 40 quickly. Thus, a single TCP connection will be made and kept open until the full response has been retrieved.

Asynchronous transaction is supported generally for situations in which there may be a long delay in application server 40 response. Specifically, a proxy will accept a request from a customer or client 10 via an SSL connection and then respond to the client 10 with a unique identifier and close the socket connection. The client 10 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the programmer to code resumption of a transfer at a later point in time.

Figure 5:
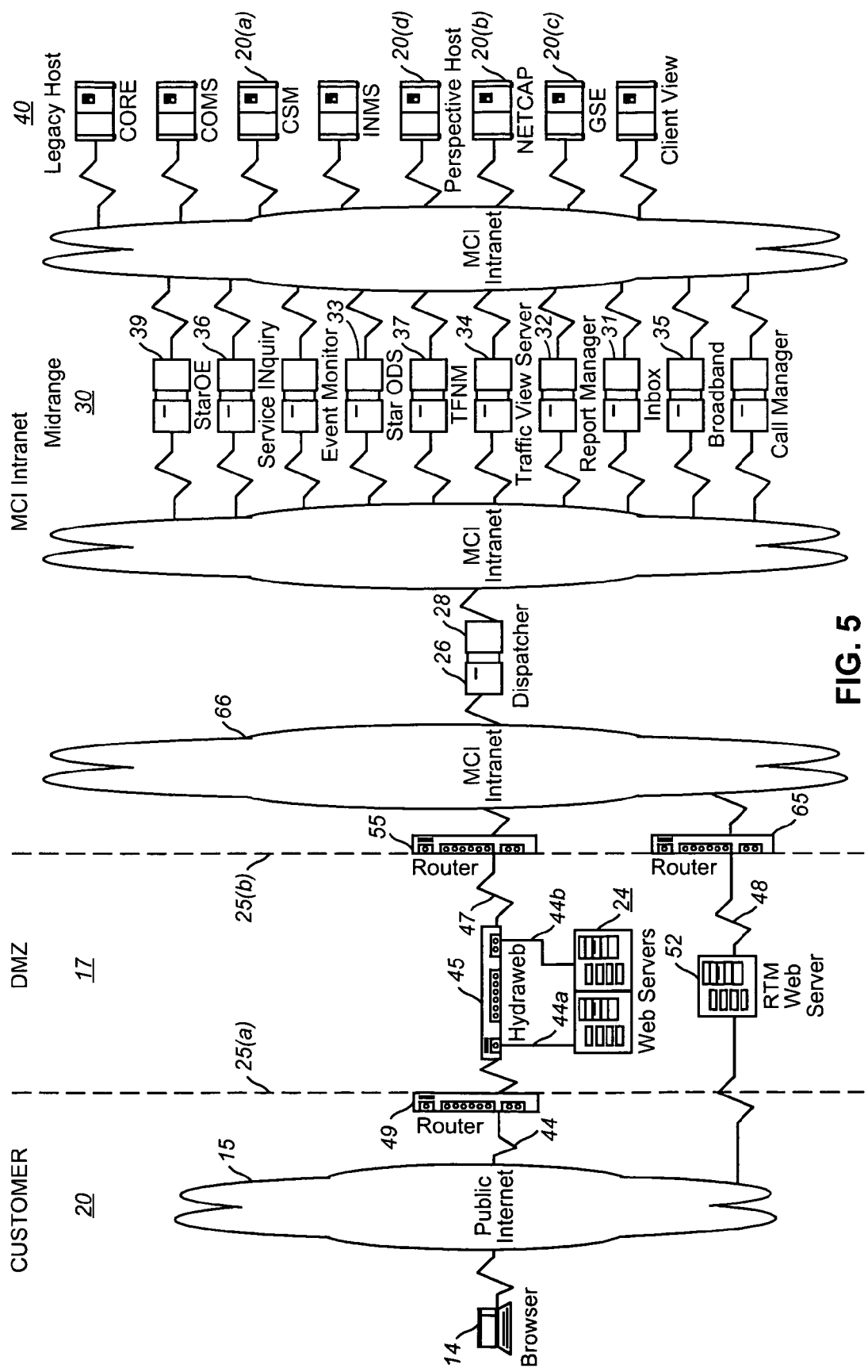
FIG. 5 is a diagram depicting the physical networkMCI Interact system architecture.

FIG. 5 is a diagram depicting the physical networkMCI Interact system architecture 10. As shown in FIG. 5, the system is divided into three major architectural divisions including: 1) the customer workstation 20 which include those mechanisms enabling customer connection to the Secure web servers 24; 2) a secure network area 17, known as the DeMilitarized Zone "DMZ" set aside on MCI premises double firewalled between the both the public Internet 25 and the MCI Intranet to prevent potentially hostile customer attacks; and, 3) the MCI Intranet Midrange Servers 30 and Legacy Mainframe Systems 40 which comprise the back end business logic applications.

As illustrated in FIG. 5, the present invention includes a double or complex firewall system that creates a "demilitarized zone" (DMZ) between two firewalls 25*a*, 25*b*. In the preferred embodiment, one of the firewalls 29 includes port specific filtering routers, which may only connect with a designated port address. For example, router 49 (firewall 25(*a*)) may connect only to the addresses set for the HydraWeb® (or web servers 24) within the DMZ, and router 55 (firewall 25(*b*)) may only connect to the port addresses set for the dispatch server 26 within the network. In addition, the dispatch server 26 connects with an authentication server, and through a proxy firewall to the application servers. This ensures that even if a remote user ID and password are hijacked, the only access granted is to one of the web servers 24 or to intermediate data and privileges authorized for that user. Further, the hijacker may not directly connect to any enterprise server in the enterprise intranet beyond the DMZ, thus ensuring internal company system security and integrity. Even with a stolen password, the hijacker may not connect to other ports, root directories or application servers within the enterprise system, and the only servers that may be sabotaged or controlled by a hacker are the web servers 24.

The DMZ 17 acts as a double firewall for the enterprise intranet because of the double layer of port specific filtering rules. Further, the web servers 24 located in the DMZ never store or compute actual customer sensitive data. The web servers only transmit the data in a form suitable for display by the customer's web browser. Since the DMZ web servers do not store customer data, there is a much smaller chance of any customer information being jeopardized in case of a security breach. In the preferred embodiment, firewalls or routers 47,49 are a combination of circuit gateways and filtering gateways or routers using packet filtering rules to grant or deny access from a source address to a destination address. All connections from the internal application servers are proxied and filtered through the dispatcher before reaching the web servers 24. Thus it appears to any remote site, that the connection is really with the DMZ site, and identity of the internal server is doubly obscured. This also prevents and direct connection between any external and any internal network or intranet computer.

The filtering firewalls 25(*a*), (*b*) may also pass or block specific types of Internet protocols. For example, FTP can be enabled only for connections to the In-Box server 31, and denied for all other destinations. SMTP can also be enabled to the In-Box server, but Telnet denied. The In-box server 31 is a store and forward server for client designated reports, but even in this server, the data and meta-data are separated to further secure the data, as will be described.

As previously described, the customer access mechanism is a client workstation 20 employing a Web browser 14 for providing the access to the networkMCI Interact system via the public Internet 15. When a subscriber connects to the networkMCI Interact Web site by entering the appropriate URL, a secure TCP/IP communications link 22 is established to one of several Web servers 24 located inside a first firewall 25*a* in the DMZ 17. Preferably at least two web servers are provided for redundancy and failover capability. In the preferred embodiment of the invention, the system employs SSL encryption so that communications in both directions between the subscriber and the networkMCI Interact system are secure.

In the preferred embodiment, all DMZ Secure Web servers 24 are preferably DEC 4100 systems having Unix or NT-based operating systems for running services such as HTTPS, FTP, and Telnet over TCP/IP. The web servers may be interconnected by a fast Ethernet LAN running at 100 Mbit/sec or greater, preferably with the deployment of switches within the Ethernet LANs for improved bandwidth utilization. One such switching unit included as part of the network architecture is a HydraWEB® unit 45, manufactured by HydraWEB Technologies, Inc., which provides the DMZ with a virtual IP address so that subscriber HTTPS requests received over the Internet will always be received. The Hydraweb unit 45 implements a load balancing algorithm enabling intelligent packet routing and providing optimal reliability and performance by guaranteeing accessibility to the "most available" server. It particularly monitors all aspects of web server health from CPU usage, to memory utilization, to available swap space so that Internet/Intranet networks can increase their hit rate and reduce Web server management costs. In this manner, resource utilization is maximized and bandwidth (throughput) is improved. It should be understood that a redundant Hydraweb® unit may be implemented in a Hot/Standby configuration with heartbeat messaging between the two units (not shown). Moreover, the networkMCI Interact system architecture affords web server scaling, both in vertical and horizontal directions. Additionally, the architecture is such that new secure web servers 24 may be easily added as customer requirements and usage increases.

As shown in FIG. 5, the most available Web server 24 receives subscriber HTTPS requests, for example, from the HydraWEB™ 45 over a connection 44*a* and generates the appropriate encrypted messages for routing the request to the appropriate MCI Intranet midrange web server over connection 44*b*, router 55 and connection 23. Via the Hydraweb unit 45, a TCP/IP connection 38 links the Secure Web server 24 with the MCI Intranet Dispatcher server 26.

Further as shown in the DMZ 17 is a second RTM server 52 having its own connection to the public Internet via a TCP/IP connection 48. As described in co-pending U.S. patent application Ser. No. 09/159,516, now U.S. Pat. No. 6,470,386, entitled INTEGRATED PROXY INTERFACE FOR WEB BASED TELECOMMUNICATIONS MANAGEMENT TOOLS, incorporated by reference as if fully set forth herein, this RTM server provides real-time session management for subscribers of the networkMCI Interact Real Time Monitoring system. An additional TCP/IP connection 48 links the RTM Web server 52 with the MCI Intranet Dispatcher server 26. As further shown in FIG. 5, a third router 65 is provided for routing encrypted subscriber messages from the RTM Web server 52 to the Dispatcher server 26 inside the second firewall. Although not shown, each of the routers 55, 65 may additionally route signals through a series of other routers before eventually being routed to the nMCI Interact Dispatcher server 26. In operation, each of the Secure servers 24 function to decrypt the client message, preferably via th SSL implementation, and unwrap the session key and verify the users session from the COUSser object authenticated at Longon.

After establishing that the request has come from a valid user and mapping the request to its associated session, the Secure Web servers 24 will re-encrypt the request using symmetric RSA encryption and forward it over a second secure socket connection 23 to the dispatch server 26 inside the enterprise Intranet.

As described herein, and in greater detail in co-pending U.S. patent application Ser. No. 09/159,695, the data architecture component of networkMCI Interact reporting system is focused on the presentation of real time (un-priced) call detail data, such as provided by MCI's TrafficView Server 34, and priced call detail data and reports, such as provided by MCI's StarODS Server 33 in a variety of user selected formats.

All reporting is provided through a Report Requestor GUI application interface which support spreadsheet, a variety of graph and chart type, or both simultaneously. For example, the spreadsheet presentation allows for sorting by any arbitrary set of columns. The report viewer may also be launched from the inbox when a report is selected.

Report management related data is also generated which includes 1) report profiles defining the types of reports that are available, fields for the reports, default sort options and customizations allowed; and 2) report requests defining customer specific report requests including report type, report name, scheduling criteria, and subtotal fields. This type of data will be resident in an Inbox server database and managed by the Inbox server.

The Infrastructure component of the nMCI Reporting system includes means for providing secure communications regardless of the data content being communicated. As described in detail in above-referenced, co-pending U.S. patent application Ser. No. 09/159,514, now U.S. Pat. No. 6,598,167, the nMCI Interact system security infrastructure includes: 1) authentication, including the use of passwords and digital certificates; 2) public key encryption, such as employed by a secure sockets layer (SSL) encryption protocol; 3) firewalls, such as described above with reference to the network architecture component; and 4) non-repudiation techniques to guarantee that a message originating from a source is the actual identified sender. One technique employed to combat repudiation includes use of an audit trail with electronically signed one-way message digests included with each transaction.

Another component of the nMCI Interact infrastructure includes order entry, which is supported by the Order Entry ("StarOE") server. The general categories of features to be ordered include: 1) Priced Reporting; 2) Real-time reporting; 3) Priced Call Detail; 4) Real Time Call Detail; 5) Broadband SNMP Alarming; 6) Broadband Reports; 7) Inbound RTM; 8) Outbound RTM; 9) Toll Free Network Manager; and 10) Call Manager. The order entry functionality is extended to additionally support 11) Event Monitor; 12) Service Inquiry; 13) Outbound Network Manager; 14) Portfolio; and, 15) Client View.

The Self-monitoring infrastructure component for nMCI Interact is the employment of mid-range servers that support SNMP alerts at the hardware level. In addition, all software processes must generate alerts based on process health, connectivity, and availability of resources (e.g., disk usage, CPU utilization, database availability).

The Metrics infrastructure component for nMCI Interact is the employment of means to monitor throughput and volumes at the Web servers, dispatcher server, application proxies and mid-range servers. Metrics monitoring helps in the determination of hardware and network growth.

To provide the areas of functionality described above, the client tier 10 is organized into a component architecture, with each component providing one of the areas of functionality. As explained in further detail in co-pending U.S. patent application Ser. No. 09/159,515, now U.S. Pat. No. 6,115,040, the client-tier software is organized into a "component" architecture supporting such applications as inbox fetch and inbox management, report viewer and report requester, TFNM, Event Monitor, Broadband, Real-Time Monitor, and system administration applications. Further functionality integrated into the software architecture includes applications such as Outbound Network Manager, Call Manager, Service Inquiry and Client View.

Figure 6:
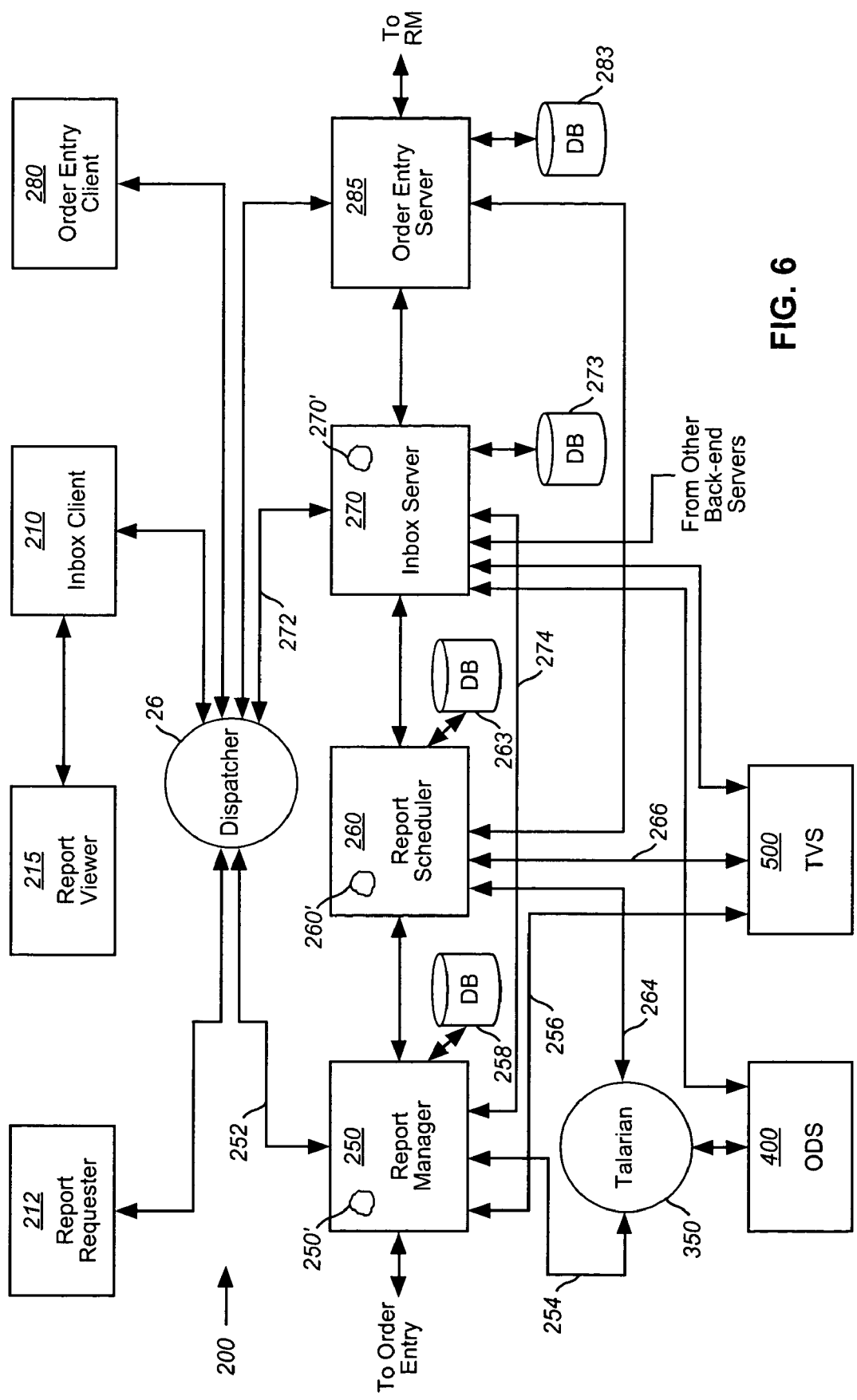
FIG. 6 is a block diagram depicting the physical architecture of the StarWRS component 200 of the networkMCI Interact system.

The present invention focuses on the client and middle-tier service and application proxy components that enable customers to request, specify, customize, schedule and receive their unpriced telecommunications network traffic call detail data and account information in the form of reports that are generated by a back-end application server. Referred to herein as "StarWRS," this WWW/Internet Reporting System 200, as shown in FIG. 6, comprises the following components and messaging interfaces:

1) those components associated with the Client GUI front end including a report requester client application 212, a report viewer client application 215 and, an Inbox client application 210 which implement the logical processes associated with a "Java Client", i.e., employs Java applets launched from the backplane (FIG. 3) that enable the display and creation of reports and graphs based on the fields of the displayed reports, and, allows selection of different reporting criteria and options for a given report; and, 2) those middle-tier server components enabling the above-mentioned reporting functionality including: a Report Manager server 250, a Report scheduler server 260, and an Inbox Server 270. Also shown in FIG. 6 are the system Order Entry client application 280 and a corresponding Order Entry Server 285 supporting the StarWRS reporting functionality as will be described.

Each of these components will now be described with greater particularity hereinbelow.

The Report Manager ("RM") server 250 is an application responsible for the synchronization of report inventory with the back-end "Fulfilling" servers 400, 500; retrieval of entitlements, i.e., a user's security profiles, and report pick list information, i.e., data for user report customization options, from the system Order Entry server 280; the transmission of report responses or messages to the Dispatcher server 26 (FIG. 6); the maintenance of the reporting databases; and, the management of metadata used for displaying reports. In the preferred embodiment, the RM server 250 employs a Unix daemon that passively listens for connect requests from the GUI client applications and other back-end servers and deploys the TCP/IP protocol to receive and route requests and their responses. Particularly, Unix stream sockets using the TCP/IP protocol suite are deployed to listen for client connections on a well-known port number on the designated host machine. Client processes, e.g., report requestor 212, desiring to submit requests connect to RM 250 via the dispatcher 26 by providing the port number and host name associated with RM 250. For a particular back-end server 400 providing priced reporting data, a Talarian smart socket connection 254 is provided. Request messages received by the RM server are translated into a "metadata" format and are validated by a parser object built into a report manager proxy 250' that services requests that arrive from the GUI front-end. If the errors are found in the metadata input, the RM 250 will return an error message to the requesting client. If the metadata passes the validation tests, the request type will be determined and data will be retrieved in accordance with the meta data request after which a standard response will be sent back to the requesting client. As shown in FIG. 6, interface sockets 252 are shown connecting the Dispatcher server 26 and the RM server 250 and, other socket connections 254, 256 are shown interfacing with respective back end servers 400 and 500. In one embodiment, server 400 provides a customer's priced billing data through a Talarian smart socket messaging interface 254 to the Report Manager. Particularly, as described in commonly owned, co-pending U.S. patent application Ser. No. 09/159,684, now U.S. Pat. No. 6,377,993, a back-end billing mainframe application known as the StarODS server provides such priced call detail data. Additionally, as shown in FIG. 6 and described in commonly owned, co-pending U.S. patent application Ser. No. 09/159,404, the contents and disclosure of which are incorporated by reference as if fully set forth herein, call detail data is FTP'd directly to the Inbox Server and a message is sent to the report manager server 250 from the Traffic View server ("TVS") 500. Although not shown in FIG. 6 it should be understood that the RM 250 server can manage reporting data for customer presentation from other back-end and legacy servers including, e.g., Broadband, Tool Free Network Management, and Event Monitor servers, etc. in order to present to a customer these types of network management and reporting data.

The report manager server additionally utilizes a database 258, such as provided by Informix, to provide accounting of metadata and user report inventory. Preferably, an SQL interface is utilized to access stored procedures used in processing requests and tracking customer reports. A variety of C++ tools and other tools such as Rogue Wave's tools.h++ are additionally implemented to perform metadata message parsing validation and translation functions.

The Report Manager server 250 additionally includes the scheduling information, however, a report scheduler server component passes report requests to the back-end fulfilling servers 400, 500 at the scheduled times.

Particularly, the Report Scheduler ("RS") server component 260 is, in the preferred embodiment, a perpetually running Unix daemon that deploys the TCP/IP protocol to send report requests to the back-end fulfilling servers such as the StarODS server 400, TVS server 500, and receive their responses. More particularly, the RS server 260 is a Unix server program that is designed to handle and process report requests to the fulfilling servers by deploying Unix stream sockets using the TCP/IP protocol suite, sending the request for customized reports to client connections on a well-known port number on the designated host machine. As shown in FIG. 6, interface socket connections 264, 266 are shown interfacing with respective back end servers 400 and 500. In the case of priced billing data from StarODS 400, report requests are published by the RS server 260 to a pre-defined subject on the Talarian Server. When handling other incoming messages published by back end servers using Talarian SmartSockets 4.0, another daemon process is necessary that uses Talarian C++ objects to connect their message queue and extract all messages for a given subject for storage in a database table contained in database 263. Each message includes the track number of the report that was requested from the fulfilling server.

From the report requestor interface, the user may specify the type of reporting, including an indication of the scheduling for the report, e.g., hourly, daily, weekly or monthly. For priced data the user has the option of daily, weekly, or monthly. For real-time, or unpriced data, the user has the option of hourly, daily, weekly or monthly. The report scheduler interface additionally enables a user to specify a pager or E-mail account so that an e-mail or pager message may be sent to indicate when a requested report is in the Inbox server 270.

As shown in FIG. 6, the report scheduler server 260 interfaces directly with the Report Manager server 250 to coordinate report request scheduling and processing. It should be understood that the respective report management and scheduling functions could be performed in a single server.

The Inbox Server component 270 serves as the repository where the completed user report data is stored, maintained, and eventually deleted and is the source of data that is uploaded to the client user via the dispatcher over a secure socket connection 272 between the Web server and the browser. It is also a Unix program that is designed to handle and process user requests submitted in meta data format using an Informix database. Once report results are received from the StarODS 400 and TVS 500 and any other back-end or fulfilling servers (not shown), the Report Manager server 250 communicates the corresponding report metadata to the Inbox server 270 over socket connection 274 as shown in FIG. 6. The metadata will be stored in the Inbox server database 273 along with the report results. Thus, if the meta data is required to be changed, it will not interfere with the information needed to display the reports contained in the Inbox. Additionally, as shown in FIG. 6, the Inbox server interfaces with the report scheduler to coordinate execution and presentation of reports.

The StarOE server 280 is the repository of user pick lists and user reporting entitlements as shown in database 283. Particularly, it is shown interfacing with the Inbox server 270 and report scheduler servers 260. The Report Manager does not interface with or contain metadata for StarOE. It will, however, include information in the report metadata that will tell the Report Requestor it needs to get information (i.e., Pick Lists) from StarOE server 285.

A common database may be maintained to hold the common configuration data which can be used by the GUI applications and by the mid-range servers. Such common data will include but not be limited to: customer security profiles, billing hierarchies for each customer, general reference data (states, NPA's, Country codes), and customer specific pick lists: e.g., ANI's, calling cards, etc. An MCI Internet StarOE server will manage the data base for the common configuration of data.

With regard to the front-end client GUI components, the above-mentioned Inbox client application 210 functions as an interface between the client software and the Inbox server 270 for presenting to the customer the various type of reports and messages received at the Inbox including all completed reports, call detail, and marketing news messages. Preferably, the messages for the user in the inbox are sorted by type (report, call detail, alarms) and then by report type, report name, date, and time.

Particularly, the Inbox client application uses the services of the backplane (FIG. 3) to launch other applications as needed to process report messages. The inbox will also use the services of the data export objects to provide a save/load feature for inbox messages, and, is used to provide a user-interface for software upgrade/download control. Inbox messages are generated by the versioning services of the backplane; actual downloads will be accomplished by a request through the inbox.

In the preferred embodiment, the inbox client is able to receive information on multiple threads to allow a high priority message to get through even if a large download is in progress. Typically, the browser is configured to allow more than one network connection simultaneously, i.e., the polling thread on the client uses a separate connection to check for new messages, and starts a new thread on a new connection when a new message is detected. In this way, multiple messages may be downloaded simultaneously.

The Report Requestor application 212 is a GUI Applet enabling user interaction for managing reports and particularly includes processes supporting: the creation, deletion, and editing of the user's reports; the retrieval and display of reports based on selected criteria; the display of selected option data; and the determination of entitlements which is the logical process defining what functionality a user can perform on StarWRS. In the preferred embodiment, the Report requester additionally enables a user to specify the frequency of report generation, e.g., periodically, or as "one-shots" to be performed at a later time. As described herein, the report scheduler service maintains a list of requested reports for a given user, and forwards actual report requests to the appropriate middle-tier servers at the appropriate time. Additional functionality is provided to enable customers to manage their inventory, e.g., reschedule, change, or cancel (delete) report requests.

In the preferred embodiment, the report requestor utilizes the platform client JAVA code to communicate with the report manager server. To communicate with the StarOE for user security, hierarchy, paging and e-mail, etc. the Report Requestor uses StarOE client Java code. Report Requestor JAVA applets implementing the above-described report requestor functionality, are downloaded to the customer's workstation in the form of a cab file after initial login.

The Report Viewer application 215 is a GUI Applet enabling a user to analyze and display the data and reports supplied from the fulfilling servers such as StarODS 400, Traffic View ("TVS") 500, and other systems such as Broadband and toll free network manager. Particularly, the Report Manager 250 includes and provides access to the metadata which is used to tell the Report Requestor what a standard report should look like and the "pick-list" options the user has in order for them to customize the standard report. It is additionally used to tell the Report Viewer client how to display the report, what calculations or translations need to be performed at the time of display, and what further customization options the user has while viewing the report. It additionally includes a common report view by executing a GUI applet that is used for the display and graphing of report data and particularly, is provided with spreadsheet management functionality that defines what operations can be performed on the spreadsheet including the moving of columns, column suppression, column and row single and multiple selection, import and export of spreadsheet data, printing of spreadsheet, etc. It is also provided with report data management functionality by defining what operations can be performed on the data displayed in a spreadsheet including such dynamic operations as sorting of report data, sub-totaling of report data, etc. Furthermore, the report viewer 215 is provided with functionality enabling the interpretation of Meta Data; and, functionality enabling communication with the Backplane (FIG. 3). The Report Viewer application 215 additionally accepts messages telling it to display an image or text that may be passed by one of the applications in lieu of report data (e.g., Invoice, Broadband report, etc.)

All reporting is provided through the Report Viewer interface which supports text displays, a spreadsheet, a variety of graphic and chart types, or both spreadsheet/graph simultaneously. The spreadsheet presentation allows for sorting by any arbitrary set of columns. The report viewer 215 is launched from the inbox client 210 when a report is selected.

By associating each set of report data which is downloaded via the Inbox server 270 with a "metadata" report description object, reports can be presented without report-specific presentation code. At one level, these metadata descriptions function like the catalog in a relational database, describing each row of a result set returned from the middle tier as an ordered collection of columns. Each column has a data type, a name, and a desired display format, etc. Column descriptive information will be stored in an object, and the entire result set will be described by a list of these objects, one for each column, to allow for a standard viewer to present the result set, with labeled columns. Nesting these descriptions within one another allows for breaks and subtotaling at an arbitrary number of levels.

The same metadata descriptions may be used to provide common data export and report printing services. When extended to describe aggregation levels of data within reporting dimensions, it can even be used for generic rollup/drilldown spreadsheets with "just-in-time" data access.

The metadata data type may include geographic or telecommunications-specific information, e.g., states or NPAs. The report viewer may detect these data types and provide a geographic view as one of the graph/chart types.

Figure 7:
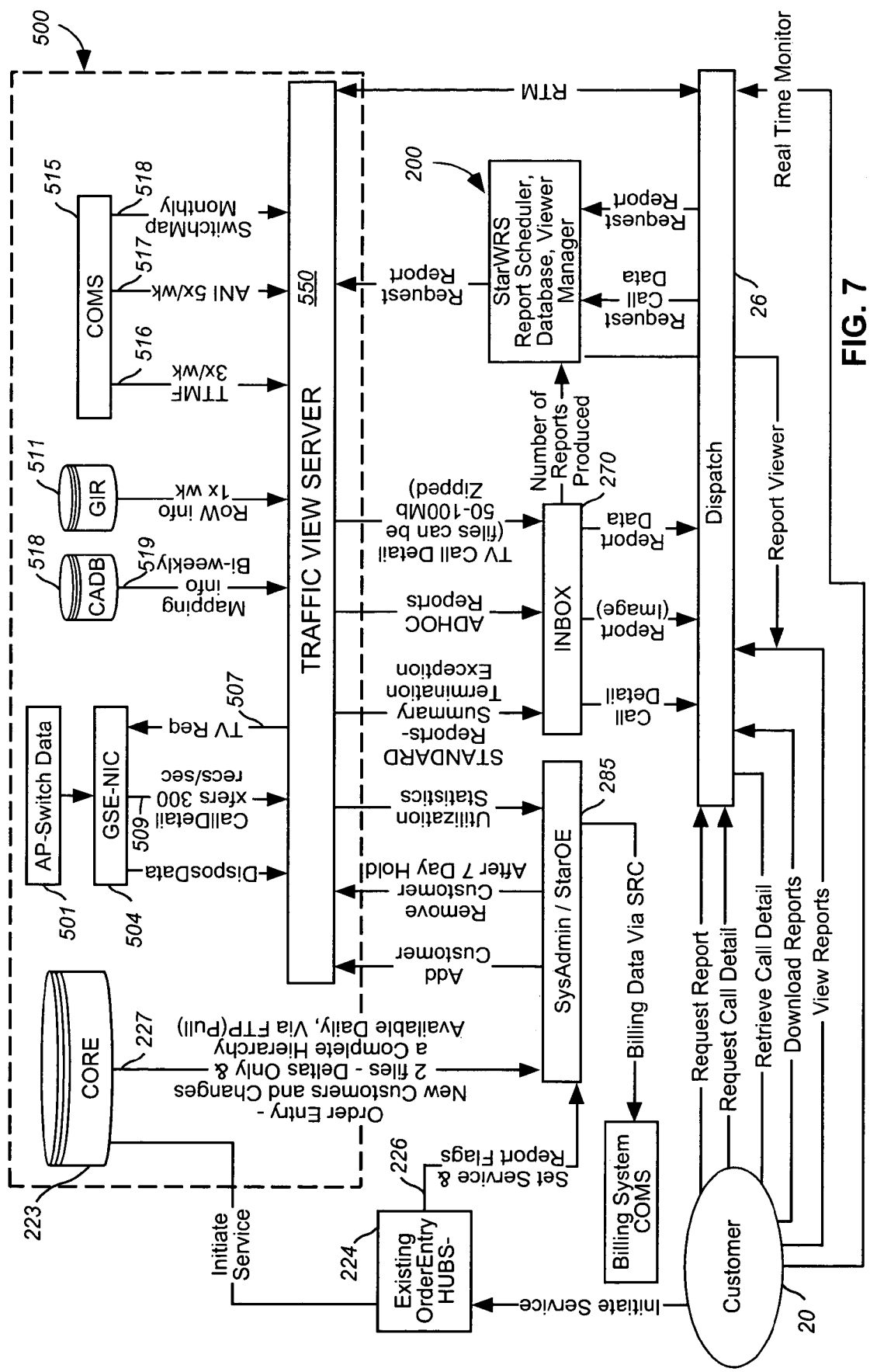
FIG. 7 is a schematic diagram depicting the nMCI Interact Traffic View system 500 for reporting customer's unpriced call detail data substantially in real-time.

Referring now to FIG. 7, the traffic view system ("TVS") 500 of the present invention comprises a Traffic View Server 550 which functions to store network call detail records (CDRs) and statistics, generate reports and deliver reports and/or call detail to the customer via the StarWRS Web Reporting System, and, supplies on-line customer access to call detail and hourly statistics that aid the customer in Network management, call center management and customer calling pattern analysis. For real time (unpriced) data, statistics are generated for the following totals: minutes, attempts, completes, incompletes, other, dto (direct termination overflow), short calls, didn't wait, didn't answer, tcc, and equipment failures.

Figure 8:
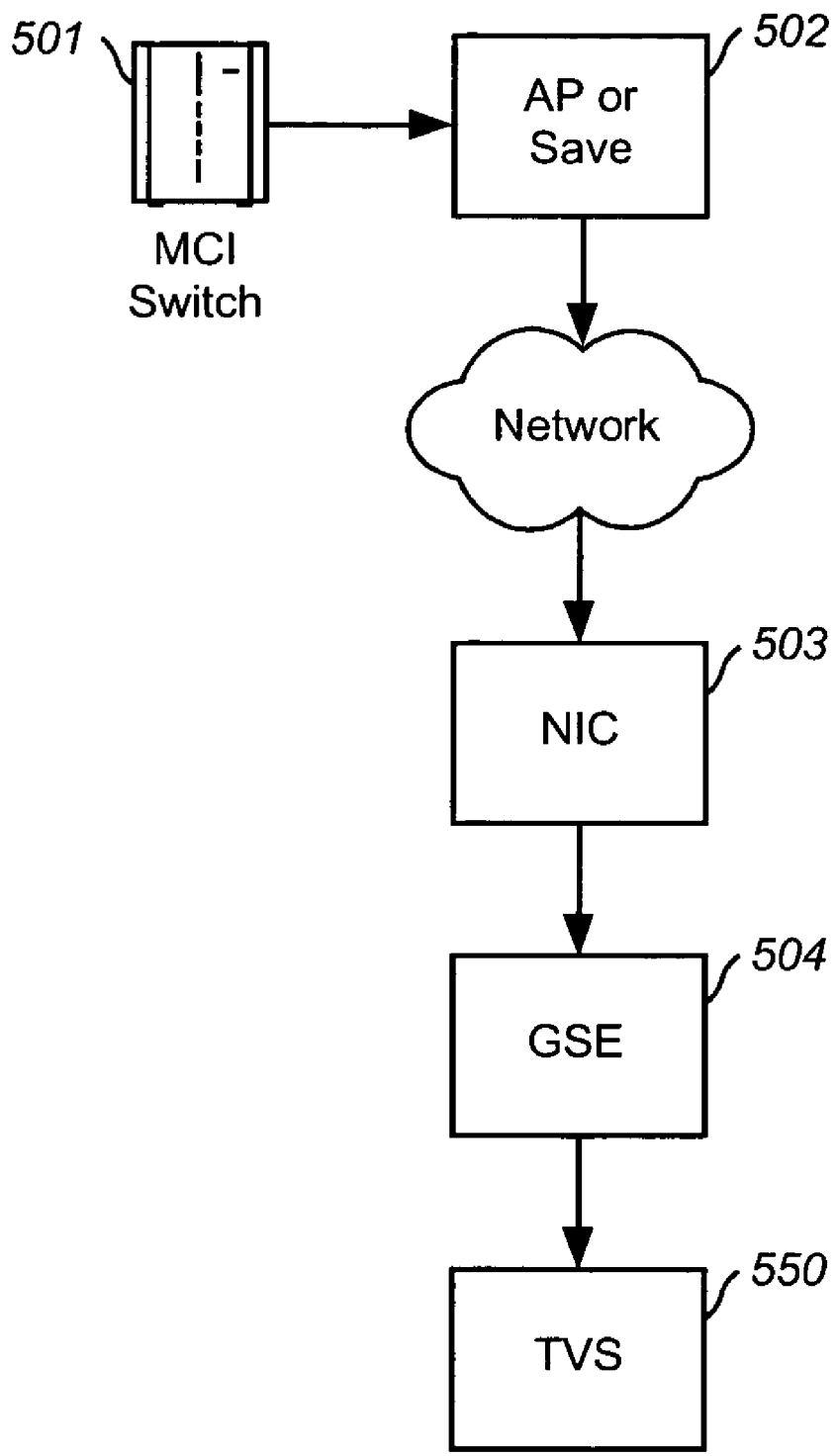
FIG. 8 is an general flow diagram of the process by which the TVS server 550 gets data.

The process by which the TVS server 550 gets data is now explained in greater detail with reference to FIGS. 7 and 8. As shown, call records are created by a network switch 501. An AP (Adjunct processor) or Storage and Verification Elements ("SAVE") platform 502 is co-located with each switch and receives all the call records from the switch as soon as possible after a call disconnects. The AP/SAVE sends all the call records to a (Network Information Concentrator (NIC) 503 where records are grouped together and those groupings numbered for a more efficient network utilization. If the NIC determines that it is missing a gap in the numbers, it will request the AP/SAVE resend that group of data to ensure that no data is lost. Should the NIC be unavailable to receive data, the AP/SAVE queues the data for later delivery. The NIC 503 receives all calls from all switches as soon as possible after a call has disconnected (hangs up) and distributes records to clients that match a certain criteria.

A generalized statistics engine (GSE) component 504 receives all records that are considered to be a toll free (800/8xx, etc) call from the NIC and also employs the same sequencing of groups of records to ensure that no data is lost. Should the GSE be unavailable, the NIC will queue the data for later delivery. The GSE component 504 further filters toll-free calls to only process calls that match a subscriber list which is maintained by an order entry OE process on the GSE (not shown) that accepts add & delete requests from TVS via a messaging interface 507 as shown in FIG. 7. The GSE component then formats the CDRs, i.e., enhances the call records, from the form as originally provided at the switch, into a normalized form to allow for a common record format regardless of the type of switch that created the record, or the exact call record type. For example, different network switches generate different call detail records, e.g., call detail record, enhanced call detail records, etc., which denote differences in toll-free services and features. This type of call detail record generated by GSE component is herein referred to as a TCR (Translated Call Record).

Groups of TCRs are sent from the GSE to TVS via TCP/IP. When TVS has safely stored that record it sends an acknowledgment to the GSE 504 so that the GSE may dispose of the group. Should TVS not be available to receive data, GSE queues data to be sent later.

Figure 9:
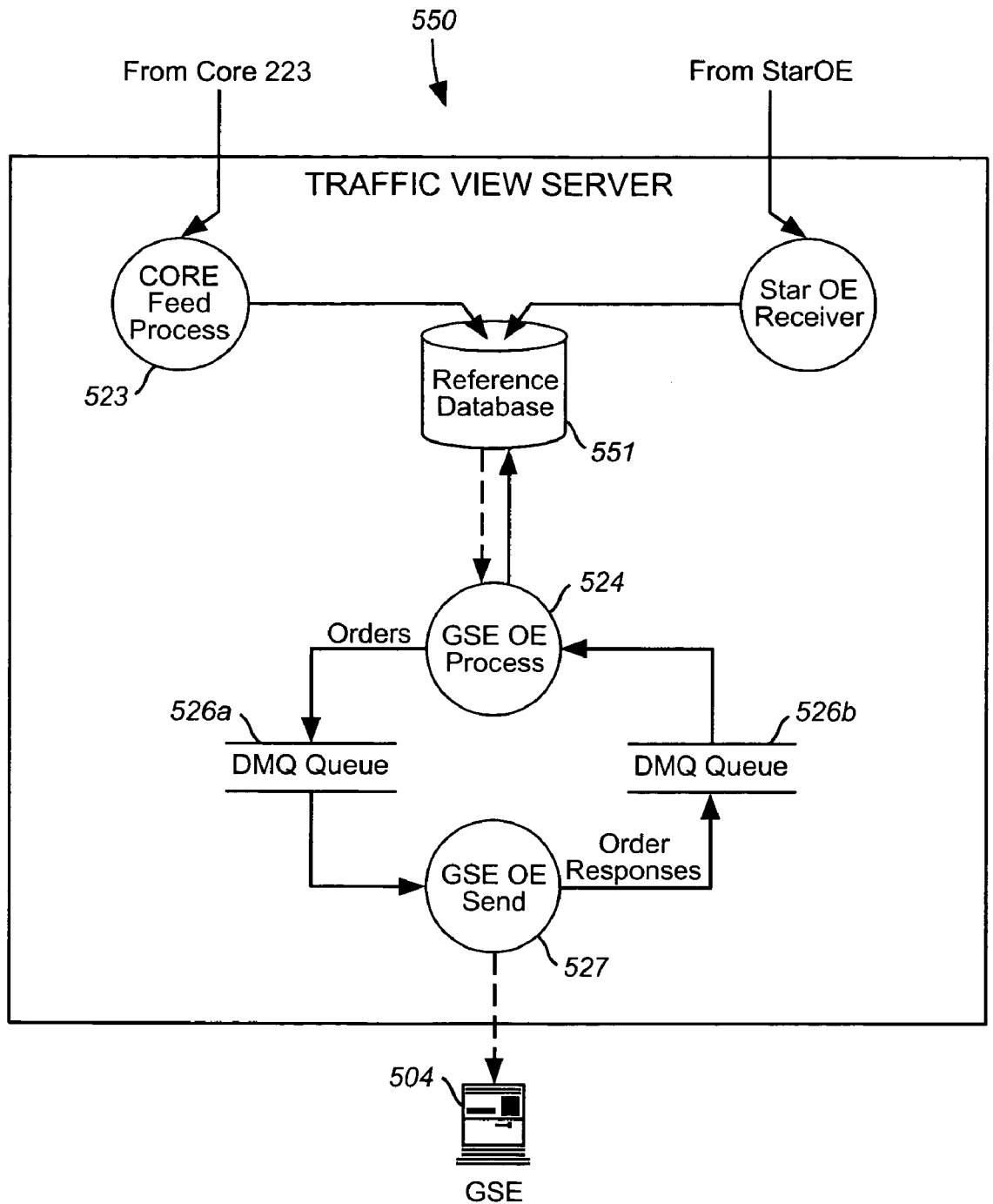
FIG. 9 is a detailed flow diagram depicting the internal TVS server processes for receiving customer TVS enablement data from order entry and CORE systems.

As shown in FIG. 7, in the preferred embodiment, initial customer provisioning occurs at either the Corporate Order Entry system 223 (CORE) or the StarOE server 285 component of MCI Interact. As shown in FIG. 9, CORE 223 transmits daily to the TVS server 550 via Network Data Mover (NDM) files which comprise information about new reports for TVS to create, and where to send those reports, e.g., FAX, E-Mail, or U.S. Mail. In the NMCI Interact TrafficView Server 550, a CORE FEED process 523 provisions reporting order and profiles into a reference database 551, and sets up scheduled reports to work on the next boundary, e.g., hourly, daily reports at midnight the next complete day, weekly reports at the end of the next week, monthly reports at the end of the month, etc. If this report requires Call detail records, as opposed to aggregated data, a CDR database is selected based on weighted values for the existing database. If a request contains a toll-free number that has not been provisioned with the GSE, a GSE_OE process 524 is invoked to forward the order, e.g., toll-free number, from the reference database onto a DEC Message Queue™ "DMQ" 526a. A GSE_OE_SEND process 527 is invoked to keep a TCP/IP socket open to the GSE process so that the pending order may be forwarded to the GSE 504 via a TCP/IP interface. Once the order has been provisioned in GSE the GSE may start to collect CDRs based on the requested toll-free number. In response, the GSE will invoke the GSE_OE_SEND process 527 to send an order response to a DMQ 526b, where it will be accessed by the GSE_OE process 524. The GSE_OE process 524, in turn, will confirm that the number has been provisioned within the TVS server and will update the reference database accordingly by removing the order from a pending order list. Invocation of the GSE_OE process and the GSE_OE_SEND process enables tracking of new customer orders, i.e., new toll-free network numbers for which CDR data is to be collected.

As further shown in FIGS. 7 and 9, in the preferred embodiment, requests to enable TrafficView customers are received in real-time from StarOE 285 via TCP/IP. Generally, StarOE specifies what general categories of reports can be requested for a given nMCI Interact subscriber. These categories include: 1) reports that only require data aggregation; 2) reports that require call detail records to be collected; and 3) real-time monitor (RTM) reports. This is provisioned into the reference database 551 for future verification of requests from the nMCI Interact platform. If a request contains a toll-free number that has not been provisioned with the GSE, a subscription request is sent to the GSE 504 via the GSE_OE and GSE_OE-SEND process to start collecting TrafficView data pertaining to that toll-free number. This request is sent by placing a request onto the DMQ queue 526a, and the GSE_SEND_OE process 527 then forwards this request to the GSE 504 via a TCP/IP interface. In the preferred embodiment, the content and format of an "order entry" message generated by the TVS server for requesting unpriced traffic data from the GSE is provided in Appendix H. In accordance with this messaging, the GSE selects all TCR's for TVS enabled customers and places them in a SAVE storage queue, e.g., Versant or Talarian, for subsequent distribution to the TVS server.

As further shown in FIG. 7, an input feed from the calling area database component 508 ("CADB") provides the TVS server 550 with reference data including state and country information for mapping NPA/NXX (Numbering Plan Area/Number Exchange) to city name and state code, and, for mapping country codes to country names. Data is transported from the CADB database 518 to the TVS server via a network data mover ("NDM") or FTP via interface 519.

A further input feed from the Global Information Repository "GIR" component 511 provides the TVS server with International toll-free number terminations on a periodic basis.

From the circuit order management system ("COMS") component 515, TVS receives three NDM feeds: 1) a Trunk Type Master feed 516 used in Un-priced Reporting to map enhanced voice service/dedicated access line (EVS/DAL) information to specific service locations; 2) an automatic number identification ("ANI") feed 517 also used in Unpriced Reporting to map EVS/DAL information to specific service locations; and, 3) a switch mapping feed 518 to map the switch ID (per Network control system) to the billing representations of the same switch.

As further shown in the FIG. 7, unpriced data collection process begins with the placement of an order for unpriced reporting with the customer's account team. Specifically, the account team places the order in real time using an ordering system component. In a periodic process, this order information is transmitted to OEHubs 224, e.g., via e-mail which later inputs the necessary service and reporting flags to the StarOE component 285, via messaging interface 226. The OEHubs 224 further adds new customers to the corporate order entry ("CORE") system component 223, which provides customer billing hierarchy information used by the StarWRS system. The new customer hierarchy information is extracted by the CORE system 223, and is available for pickup by the StarOE server 285 via messaging interface 227.

The StarOE server 285 then messages the Traffic View Server 550 in real time via TCP/IP that the number has been added for Unpriced Reporting. The TVS additionally messages the GSE component 505 in real time to immediately initiate the collection of call detail for that number, as will be described in greater detail herein. Due to latency inherent in the fulfillment process, customers may select and receive daily reports after CDR collection begins.

In accordance with the invention, a wide variety of reports and reporting frequencies are available. In the preferred embodiment, reports are available in hourly, daily, weekly, and monthly frequencies. Types of TVS reports that are available to customers include: Standard reports; Summary reports; Termination Reports; Exception reports; and, unpriced call detail. For example, Standard reports that may be generated from stored Toll Free hourly statistics include, but are not limited to: Summary by Toll Free Number and Hour which is available in the following frequencies (Ad-hoc "A", Daily "D", Weekly "W", and Monthly "M"); Summary by Toll Free Number and Date(A,D,W,M); Summary by Toll Free Number and day of week ("DOW") (A,W,M); Summary by Toll Free Number and Week (A,M); Summary by Toll Free Number and NPA (A,D,W,M); Summary by Toll Free Number, Service Location and Hour(A, D,W,M); Summary by Toll Free Number, Service Location and Date (A,D,W,M); Summary by Toll Free Number, Service Location and DOW (A,W,M); Summary by Toll Free Number, Service Location and Week (A,M); Summary by Service Location and Hour (A,D,W,M); Summary by Service Location and Date (A,D,W,M); Summary by Service Location and DOW (A,W,M); Summary by Service Location and Week (A,M); Summary by Service Location, Toll Free Number and Hour (A,D,W,M); Summary by Service Location, Toll Free Number and Date(A,D,W,M); Summary by Service Location, Toll Free Number and DOW (A,W,M); Summary by Service Location, Toll Free Number and Week (A,M). The Toll Free Summary Reports generally comprise three sections: Summary, Incomplete Call Analysis, and Network Customer Blocked Analysis (other category breakdown). The Termination Summaries include three types of termination reports: Toll Free by Location, i.e., showing termination summary and incomplete call analysis by service location for a specific Toll Free number; By Location, i.e., by service location across all Toll Free numbers terminating to the same service location; and, Location by Toll Free, i.e., for a specific service location, shows each Toll Free number terminating to this location. The originating NPA/Country Code summary reports provide information by NPA and Country for each Toll Free number attached to the report.

Additionally available are what are called Call Detail Exception Reports/images which provide reporting information pertaining to the following: Completion Rate and Retry (A,D,W,M); Completion Rate and Retry with Queue Abandonment (A,D,W,M); Lost Caller and Retry (A,D,M); Lost Caller and Retry with Queue Abandonment (A,D,M); Most Frequent Calling Numbers (A,D,W,M); Most Frequent Calling NPA/NXX (A,D,W,M); Most Frequent Calling Country (A,D,W,M).

The nMCI Interact Exception reports (images) includes: Completion Rate and Retry (A,D,W,M); Completion Rate and Retry with Queue Abandonment (A,D,W,M); Lost Caller and Retry (A,D,M); Lost Caller and Retry with Queue Abandonment (A,D,M); Most Frequent Calling Numbers (A,D,W,M); Most Frequent Calling NPA/NXX (A,D,W,M); and, Most Frequent Calling Country (A,D,W,M). The nMCI Interact Exception reports (data) includes: Call Detail by Originating ANI (A,D,W,M); Call Detail by ID Code (A,D, W,M); Call Detail by NCR Indicator (A,D,W,M); Call Detail by Originating State (A,D,W,M); Call Detail by Disposition (A,D,W,M); Call Detail by Service Location (A,D,W,M); Payphone Summary (A,M). Downloadable nMCI interact Call Detail reports includes Traffic view call detail (available as ad-hoc and daily) and Outbound traffic view call detail data (available as ad-hoc, daily and weekly).

As mentioned, via TCP/IP messaging, the TVS system 550 receives a request in real-time from the nMCI Interact StarOE component 285 to begin collecting call detail records for a particular TVS/Unpriced reporting customer, which number had been previously assigned during the order entry process. When a customer discontinues Unpriced Reporting for a number, this information is entered in StarOE tables where it is stored for a predetermined period subsequent to termination of the number. After the predetermined period of time, e.g., seven days, the numbers scheduled for service deletion are passed to TVS via TCP/IP connectivity in real time. After receiving this information, TVS instructs the GSE 504 in real time to stop collecting CDRs for these numbers.

Figure 10:
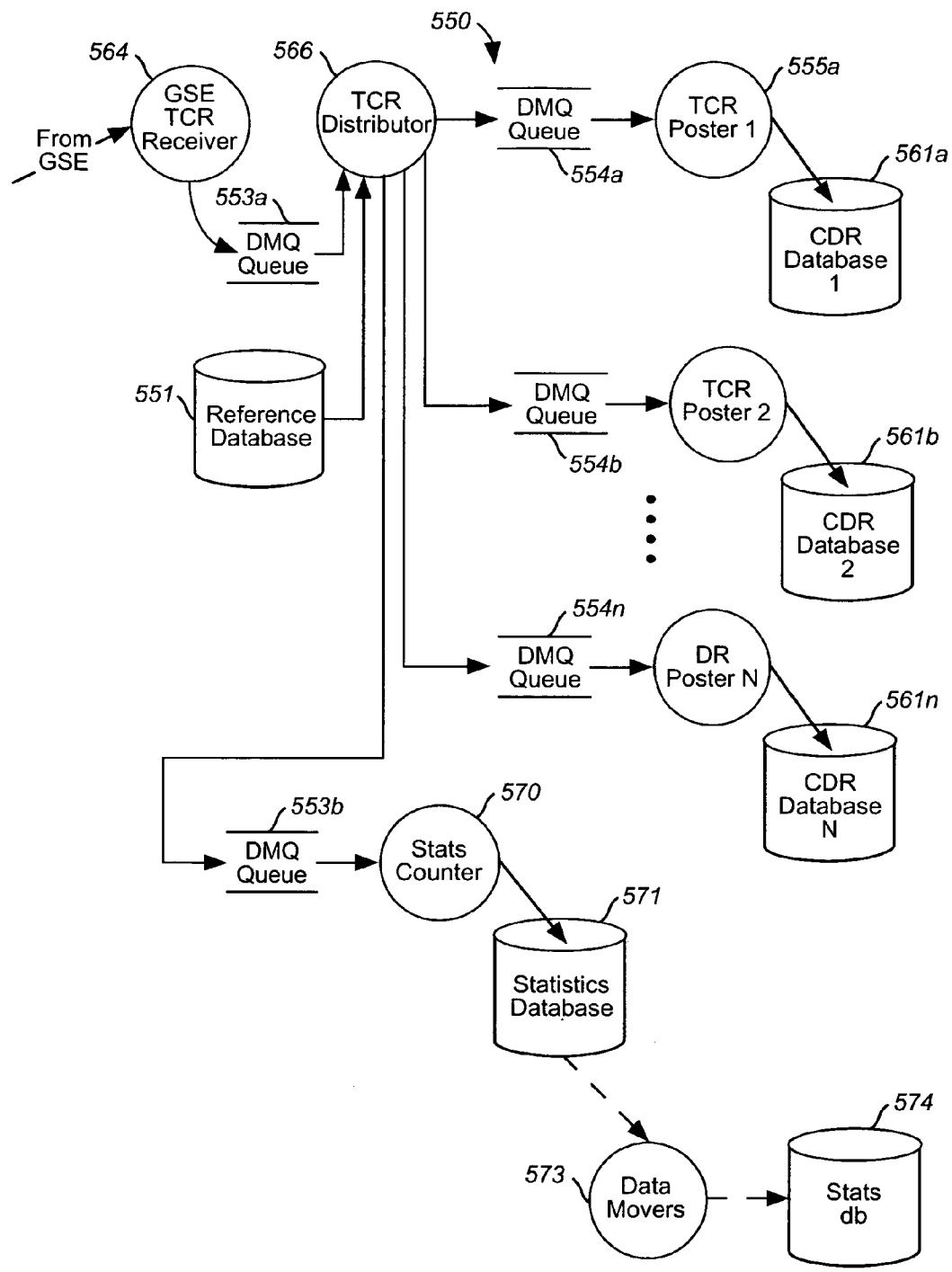
FIG. 10 is a high-level diagram depicting TCR data flow between processes internal to the TVS server.

FIG. 10 illustrates a generalized block diagram detailing the internal TVS data acquisition processes. As shown in FIG. 10, a TVS server "GSE_TCR_RCVR" process 564 receives a group of TCR records from the GSE component 504. The GSE_TCR_RCVR process 564 inserts that group into a DMQ (DecMessageQueue) queue 553a that provides a guaranteed message delivery. Upon successful storing of a record into the DMQ queue 553a, the GSE_TCR_RCVR process 564 sends an acknowledgment to the GSE component 504 so that it may delete that group. If TVS fails to acknowledge this group after a predetermined timeframe, the GSE continues to resend this group until an acknowledgment is received. The TCR_DISTRIB process 566 reads groupings of records and distributes a record based on the toll-free number associated with that record in the following manner:

First, as the reference database 551 contains information on which toll-free number belongs in which CDR database associated with the TVS server, records are grouped for each CDR database 561a,561b, . . . ,561n, to which they belong. The reference database 551 additionally flags which numbers are to have statistics collected for them. Thus, an additional group of records is created and may be routed to a DMQ Queue 553b which inputs these records into a statistics "stats" counter process 570 for statistics processing, as will be described in greater detail herein. When all the records in the group have been read, each group is written to it's DMQ queue 554a,554b, . . . ,554n associated with its destination database CDR Database 561a, 561b, . . . ,561n. For instance, via a TCR Poster process 555a, records destined for CDR database 561a are forwarded from the DMQ Queue 554a. Particularly, each CDR poster process 555a, 555b, . . . ,555n reads data from it's corresponding DMQ Queue and formats & stores those records in their database.

With further regard to the stats counter 570 shown in FIG. 10, TCRs are rolled up into statistics records. Specifically, the stats counter 570 keeps counts of the following: summary information about each toll free number for an hour; summary information about each toll free number and termination for an hour; and, summary information about each toll free number and origination NPA for an hour. These statistics are kept in memory for a pre-determined amount of time, e.g., one hour. As matching records come in, statistics are updated. At the end of the time period, these records are written to the statistics database 571, and particularly high speed electronic data drives.

The statistics that are gathered for each subscriber's toll-free number in the TVS system of the invention include: total completions, total call duration, total attempts, total switch control call, total Network Control System (NCS) blocked, total NCS rejected, total network blocked (all routes busy), total supp code blocked, and out-of-band blocked. The summary table processing algorithm in Appendix I details the collection of these statistics by the GSE and the TVS summary table processing.

Additionally, statistics gathered for NP table processign include: originating NPA, total attempts per NPA, total calls completed (tcc) per NPA, total call not delivered (blocked) per NPA, total attempts for International Originations, tcc for International Originations ("IO"), total calls not delivered (blocked) for IO.

Additionally, call statistics for terminations inlcude: termination type, termination address, total completions, total call duration, and call dispositions indicating the cause of an incomplete call including: total short calls, total didn't write, and total didn't answer.

With more particularity regarding the statistics database design, and, in further view of FIG. 10, the stats_counter 570 contains processes that read TCR's from a DMQ queue, and create statistics records for input to "c_tables" in the statistics database 571.

Appendix I depicts the algorithms implemented in TVS stats_counter process 570 for generating statistics data tables so that TCR records may be processed in batches. As shown, the processes include: a summary table process which process generates statistics for call summary data; a NPA table process; Country table process and Termination table process. The stats_counter 570 enables multiple processes to be run at the same time on the same machine. To allow an arbitrary number of Stats_Counter processes, the stats databases are organized as a series of configurable tables, e.g., "C_Tables" 572, which are temporary tables that the stats counters first insert records to. These tables are identical to normal statistics tables with the exception that they include a field for the date in them. In accordance with the provision of C_tables, a pending_stats_list table and stats_table_usage_list table are used to keep track of what data is in the C_tables, and to drive the movement of data from the C_tables to a more permanent database tables 574.

Particularly, when the stats_counter process 570 starts, it performs a check of the set of "c_tables" by inserting its process name in the used_by_process field of the stats_table_usage_list table. If the stats_counter process unexpectantly dies, it reclaims the tables previously used by searching the stats_table_usage_list for tables marked with it's process name. The stats_counter process adds an entry into the pending_stats_list every time it creates stats for a new day. The usage_flag is initially set to "1" in that table. At the top of the hour, for example, the stats_counter processes marks all of the usage_flag entries to "2", and modifies the value of the used_by_process field in the stats_table_usage_list to "MOVER". The stats_counter process then searches the stats_table_usage_list for another set of tables to use for the next hours counting. If the stats_counter process cannot find a set of tables, it aborts. To avoid this, there is extra sets of "c_tables" configured with entries in the stats_table_usage_list.

Table 1 depicts an example pending_stats_list table which comprises a directory of what the stats_counter is working on, or finished with. Each record represents a name of a c_table that contains statistics, and dates that are contained in this c_table. The report generator process, and on-line access use this table to determine if there is any data in the c_tables that they may be interested in, and what the table name is. The Stats_counter processes insert records into this table, and data_mover processes 573, shown in FIG. 10, remove entries from this table.

TABLE 1 pending_stats_list table description

| Column | Type | Usage |
|---|---|---|
| data_month_day | Integer | date in form YYYYMMDD e.g. 19960822 |
| table_type | Character (16) | type of statistics data "SUMMARY" "TERMINATION" "NPA" or "COUNTRY" |
| usage_flag | Tinyint | 1 - table in use by stats_counter<br>2 - table contains data ready for access |
| table_name | Character (16) | exact name of table in use e.g. "C_NPA_03" |

Table 2 depicts an example stats_table_usage_list table which comprises a list of all the c_tables that are configured and used by the stats_counter processes and data mover processes to allocate tables amongst themselves. The number of records in this table remains static. Stats_counter processes 570 update the "used_by_process" field with their process name when they are in control of that table. At the top of the hour, they may change the used_by_process to "MOVER", and attempt to find another table that is unallocated. The movers change the used_by_process name to "NONE" when they have completed moving data from that c_table.

TABLE 2 stats_table_usage_list table description

| Column | Type | Usage |
|---|---|---|
| table_type | character (16) | type of statistics data "SUMMARY" "TERMINATION" "NPA" or "COUNTRY" |
| table_name | character (16) | exact name of table in use e.g. "C_NPA_03" |
| used_by_process | character (16) | process name of the stats_counter or "MOVER" to indicate what processes are currently using this table. "NONE" if this table is unused. |

In the preferred embodiment, there are four types of movers are currently configured to run: NPA, summary, country, and termination. Each type of mover looks in the pending_stats_list for the name of the "c_table" of the same type with a usage_flag of "2", for instance, and the earliest date. The mover then transfers the data for this date from the "c_table" to appropriate the permanent table. When the data transfer is finished, the matching record in pending_stats_list is deleted. If there are no more entries for this "c_table" in pending_stats_list, the mover process takes the precautionary step of searching the "c_table" for additional data that was not noted in pending_stats_list. Entries are then added to pending_stats_list for any data found in the "c_table". If no additional data is found, used_by_process in stats_table_usage_list is changed from "MOVER" to "NONE" for this "c_table".

Figure 11:
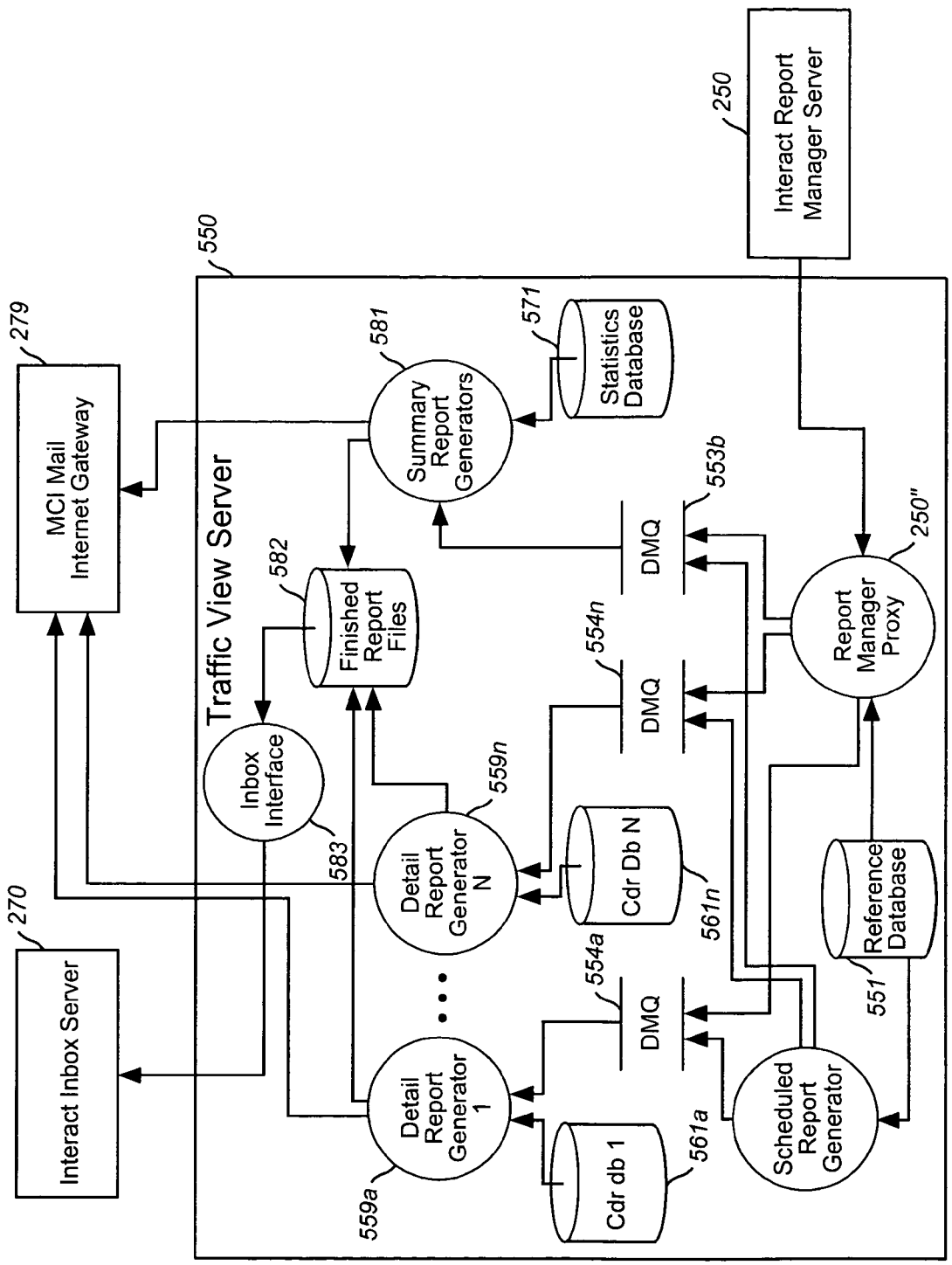
FIG. 11 is a high-level flow diagram depicting TVS report generation process.

The interaction between StarWRS web-based reporting system and TVS system 550 will now be explained in greater detail with respect to FIG. 11. In the preferred embodiment, reports may be triggered by two possible sources: Scheduled report setup by a CORE order; and, real time report requests as forwarded from the report request/ Report Manager Server 250. The report generation process is hereinafter described with respect to real-time reports from the StarWRS system.

As mentioned, requests are received in real-time from the Report Manager Server 250 which either passes on-demand reports from an end-user, or reports that it has internally scheduled via Report scheduler server 260. In the TVS server 550, a report manager proxy process 250" gathers information about the reports to be generated from the reference database 551 by determining whether the report request may be fulfilled by statistics processing, or the CDR's. If CDR's are needed, a determination is then made as to which database contains the necessary data. Additionally determined is whether the needed CDR data to fulfill the request spans a long period of time, e.g., several days. Once these determinations are made, the requests are sent from the report manager proxy process 250" to the appropriate DMQ queue 554a,554b, . . . , 554n, or 553b where they are queued up for report generation.

For the scenario requiring generation of call detail data reports, i.e., those requiring Call detail records, the destination of the report, e.g., StarWRS Inbox server 270, fax, U.S. mail, etc., is determined from the reference database 551. Then, the requested data is gathered based on the metadata request, analyzed, and formatted by various corresponding detail report generator processes indicated in FIG. 11 as processes 559a, . . . , 559n. Although not shown in FIG. 11, it should be understood that reference data that originates from CADB and COMS may be necessary to complete these reports. Furthermore, although not shown, the TVS server is provided with an additional set of queues and report generator processes for each of the CDR processing to allow longer reports to not interfere with shorter reports.

In the detail report generator processes, the data is formatted in a comma separated value (CSV) format and are input to a finished report files database 582 whereupon, an inbox server interface process 583 FTPs the report to the nMCI Interact Inbox Server 270. The Inbox interface will particularly input the completed report to the pre-defined directory in the Inbox database. Particularly, the Inbox is notified via TCP/IP that the report is complete by the Inbox Interface process and that the appropriate metadata is available for report presentation via the report viewer.

If the requested report is destined for MCI Mail delivery (Fax, Mail, U.S. Mail): then the data is formatted with headers, page breaks, line numbers into a report that is saved to a file. The report is then sent to an Internet Gateway 279, e.g., the MCI Mail Internet Gateway directly from the detail report generators 559a, . . . ,559n for delivery by MCI Mail. Once the file is successfully sent it is deleted, thus allowing for report generation to continue when the MCI Mail Internet Gateway is not available.

An identical process is implemented for those customer report requests for aggregate data, i.e., statistics. However, the data that is gathered and analyzed is retrieved from a summary report generator process 581 which retrieves the requested report data from the statistics database 571 upon a receipt of a report request from the DMQ 553b.

As described herein, when the user requests call detail for a particular period of time, this request is translated by the StarWRS component into a metadata file which is sent to TVS in the manner described herein. Users schedule reports for execution using the Report Scheduler in StarWRS in the manner as described in co-pending U.S. patent application Ser. No. 09/159,409, now U.S. Pat. No. 6,631,402. When the user has completed report selection, modifications and scheduling, the StarWRS Report Scheduler component 260 creates a metadata message comprising this information which file is passed to TVS in real time. The TVS then uses this file to formulate a query and runs the report for the scheduled time period.

After TVS runs the report, TVS sends the report to the Inbox server component 270 of StarWRS immediately after they are completed.

Figure 12A:
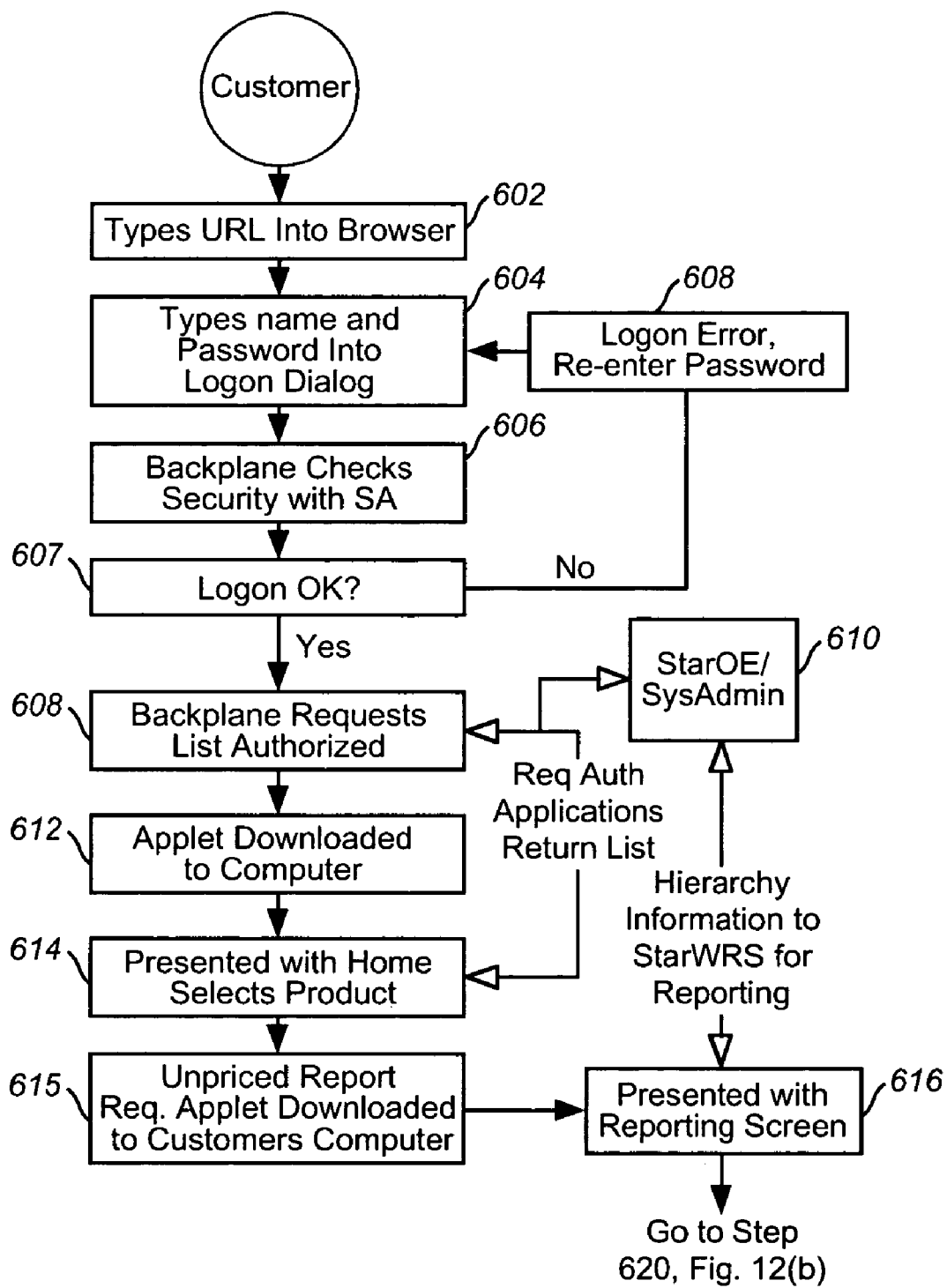
FIGS. 12(a)–12(d) illustrate the end-to-end process 700 for fulfilling unpriced call detail data report requests.
Figure 12B:
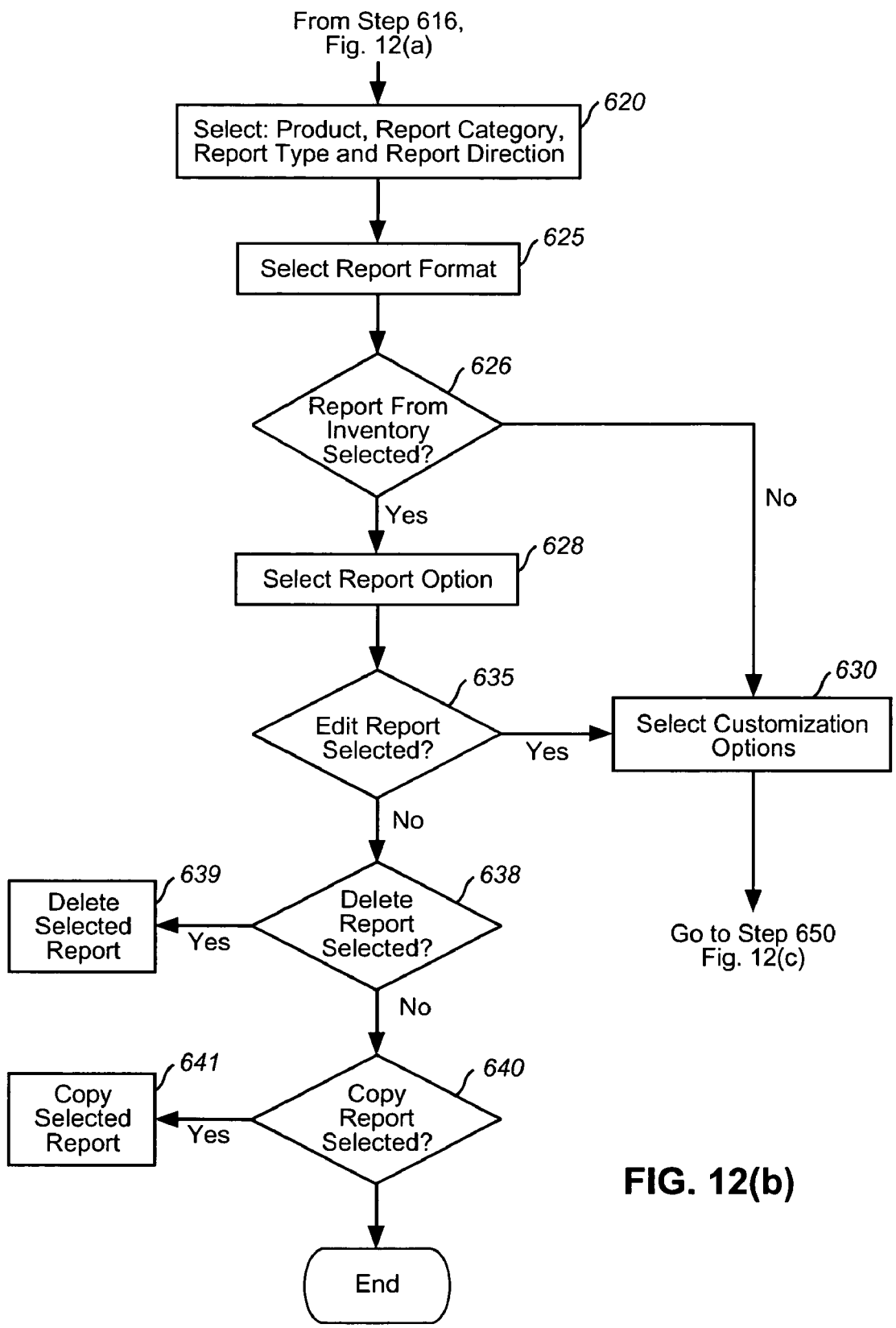

An overview of the report request/scheduling process 600 implemented by StarWRS web-based reporting component 200 will now be described herein in view of FIGS. 12(a)–12(d) as follows:

As shown in the process flow diagram of FIG. 12(a), a user first establishes communication with the DMZ Web server at step 602 and logs on to the nMCI Interact system by entering the user's name and password onto a logon dialog box, as indicated at step 604. Then, at steps 606–608, an application running on the backplane directs a "Validate User Message" common object to the StarOE server 280 via the web server and dispatcher servers (FIG. 2) to direct the StarOE server 280 to perform security validation and authenticate the user ID and password in the manner as described in commonly owned, co-pending U.S. patent application Ser. No. 09/159,514, now U.S. Pat. No. 6,598,167, entitled AUTHENTICATION AND ENTITLEMENT OF WEB BASED DATA MANAGEMENT PROGRAMS, the contents and disclosure of which is incorporated by reference herein. It is understood that all communication to the StarOE server is via TCP/IP with a Unix process listening on a known TCP port. The StarOE server acts as a proxy when messages are sent from the Dispatcher server 26 and supports synchronous transactions. All data and security information is accessed by direct queries to a StarOE server database 283, such as provided by Informix. Once a user is logged on, the Web Server 24 (FIGS. 2 and 6) requests a current list of authorized applications from the StarOE server 285 as indicated at steps 608 and 610. Particularly, as described in co-pending U.S. patent application Ser. No. 09/159,408, now U.S. Pat. No. 6,587,836, the contents and disclosure of which is incorporated by reference herein, a "Get User Application Request" message is communicated to the StarOE server via the backplane from the report requestor which queries the Informix database to obtain a list of authorized applications, i.e., services, for the user and which determines which button on the home page are active, thus controlling their access to products. This information is downloaded by a GUI applet that is executed via the Backplane (FIG. 3) and incorporated into the home page that is presented to the user as indicated at steps 612–614. An exemplary home page screen display 80 is shown in FIG. 4 which provides a list of icons 70 representing the possible options available to the user according to that customer's entitlements.

Appendix H of co-pending U.S. patent application Ser. No. 09/159,409, now U.S. Pat. No. 6,631,402, provides the format and content of the nMCI Interact common objects downloaded to the Report Requestor client application to enable web-based reporting. As shown in above-referenced Appendix H, the Report Requestor first asks for common objects for a user's default timezone, language and currency. The Report Requestor objects are invoked to retrieve from StarOE the various customer entitlements relating to security, geographical hierarchy, billing hierarchy, and paging and e-mail notification, as further shown in Appendix H.

As further shown in FIG. 12(a), the steps 615 and 616 indicate the selection and presentation of the Report Requestor display which presents the reporting options to a user in accordance with that user's entitlements as determined at previous step 610. It should be understood that in the preferred embodiment, the icons for applications the user has security access to are shown bolded. Thus, for a customer subscribing to nMCI Interact Unpriced Reporting, an Unpriced Reporting icon is automatically enabled when the home page appears.

At step 614, upon selection of a Report Requestor icon 76 from the home page screen display 80 of FIG. 4, a StarWRS report requestor, web page is presented to the customer. The backplane object allows the user access to the Report Requestor front end if the user is so authorized. As shown at step 615, a client unpriced reporting application is downloaded to the customer who is presented with the unpriced reporting dialog screen (not shown). It is from this screen that the user is presented with unpriced reporting options to view/retrieve completed reports via the StarWRS Inbox, as indicated at step 620 (FIG. 12(b)), or create a new report or, modify an existing unpriced call detail data report.

Particularly, from this dialog screen, the user is enabled to edit an existing report maintained in the report manager inventory, generate a new report, copy an existing report, or delete an existing report. When creating a new report or editing an existing report, the user may enter the desired reporting options including: 1) the report product including toll-free, MCI Vision, and MCI Vnet options; 2) the report category which includes options for: analyzing traffic, call center, call detail, checking calling frequencies, financial, marketing, monitoring usage, and telecommunications categories for toll-free, Vnet and Vision customers; 3) the report type which includes unpriced call detail data or traffic data options; and 4) a report direction and which includes inbound, outbound, or both directions. Referring to the flow chart of FIG. 12(b), user selection of the report product, report category, report type, and report direction, is indicated at step 620. Additionally, at step 625, the user may select the report format associated with a reporting category.

In accordance with the user report selections, if a report had already been created and maintained in the report manager inventory (database), it will be displayed in a report inventory field. Referring back to FIG. 12(b), at step 626, a determination is made as to whether an existing report from inventory is selected. If an existing report is not selected then the user is prompted to generate a new report according to customization options that the user is entitled for the selected report product, category, type, etc., as indicated at step 630. If an existing report is selected at step 626 based on the report product, category, type, etc., then the user is prompted at step 628 to select from among the following options: a report edit option, as shown at step 635; a report delete option, in which case the selected report will be deleted at steps 638 and 639; and, a report copy option, in which case an existing report will be copied, e.g., for subsequent editing, as shown at steps 640 and 641.

Whether creating a new report or editing an existing report, the user is enabled to select customization options as indicated at step 630, FIG. 7(b) form a new dialog screen that is presented to the user showing all the report customization categories for building a new report and/or editing an existing report. From this screen and related report building dialog boxes, all of the initial values for retrieving the MetaData, customization options and GUI builder options from the report manager server 250 necessary to build (edit) a report are provided in accordance with the user's entitlements. As described in greater detail in co-pending U.S. patent application Ser. No. 09/159,409, now U.S. Pat. No. 6,631,402, a user may provide the following customization and report builder options: general customization options; layout customization options; access customization options; hierarchy customization options; geographic customization options; and, notification customization options.

As mentioned above with respect to FIG. 6, the Report Requestor client application 212 gains access to the Metadata stored at the Report Manager server 250 through messaging. Particularly, as hereinafter described, a message generated by the Report Requestor in accordance with the user request is first received by the report manager proxy 250'. In the preferred embodiment, the report manager proxy comprises a set of tools in the form of reusable objects, preferably written in C++ code; or the like. For example, a parser object tool is employed to decompose the Metadata messages sent by the report requestor 212 to validate the message. If errors are found in the Metadata input, the RM will return an error message to the requesting client. If the Metadata passes the validation tests, the request type is then determined and the appropriate service will be invoked after which a standard response is sent back to the requesting client.

The Report Manager 250 implements stored procedures to translate the message, perform the request, and send the information back to the Report Requestor 212 which uses the metadata to determine what a standard report should look like, the customization options the user has, and the types of screens that should be used for the various options (i.e., single selection, multiple selections, etc.). It is understood that the selection of available standard template reports is based on the user's entitlements.

The following list provides the types of requests that may be initiated by the Report Requestor 212 and the responses performed by the Report Manager 250: 1) Get/Send report template list (GRTL/SRTL)—which request retrieves the list of all standard report templates for all products and is used only to obtain general report information, e.g., report title, description, etc.; 2) Get/Send report template detail (GRTD/SRTD)—which request retrieves the details of a specific standard report template; 3) Get/Send user report list (GURL/SURL)—which request retrieves the list of all user reports for the report format selected from a user report table and is used only as a request for general report information, e.g., report title, status, etc.; 4) Get/Send user report detail (GURD/SURD)—which request retrieves the details of a specific user's report; 5) Add report definition/Acknowledgment (ARD/ARDA)—which requests addition of a user-created report to a user report table. If the report is a scheduled report, this request is also communicated to the fulfilling server at the time the report is due; 6) Delete report definition/Acknowledgment (DRD/DRDA)—which request deletes a user-created report from the user table; 7) Copy report definition/Acknowledgment (CRD/CRDA)—which request creates a duplication of the report the user is editing (other than the report title) and creates a new report ID for it; 8) Update Reporting Schedule/Acknowledgment (URS/URSA)—which request updates the scheduling information on a report without having to send a Delete and Add request; and, 9) Get Pick List/Acknowledgment (GPL/GPLA)—which request enables the Report Requestor 212 to get a pick list provided by StarOE server.

In a preferred embodiment, as shown in Table 3, the interface message sent to the RM server 250 from the report requester via the Dispatcher server 24 comprises a three to four character message acronym followed by request specific parameters.

TABLE 3

| Parameter Name | Parameter Type | Required | Acceptable Value |
|---|---|---|---|
| Request | 3 or 4 Characters | Yes | Msg acronym |
| Data parms . . . | Characters | No | |

Table 4 illustrates the interface message format returned by the RM server 250.

TABLE 4

| Parameter Name | Parameter Type | Required | Acceptable Value |
|---|---|---|---|
| Response | Char (4) | Yes | Msg acronym |
| Error Code | Char (4) | Yes | 0 = OK or error |
| Data parms . . . | Char # | No | |

As shown in Table 4, the response message to be returned in Metadata format preferably includes a four character message acronym followed by an error code. A successful request (or a request acknowledgment) generates a response with an error code of "0". Additional data specific to the response follows this error code. If any server receives a message which is not known, the response message will echo the message acronym back along with an appropriate error code.

Appendix A provides a series of tables containing the content for each metadata message request that can be sent by the report requester 212 for each of the enumerated user requests, in addition to the content of the corresponding metadata message responses by the RM server 250. As an example, when a user requests a list of all standard report templates that can be created for a specified product, category, and product type, e.g., toll free unpriced data, an example metadata format is as follows:
GRTL<PRODUCT=V,DATATYPE=D,DATACAT=U, IO=O> where GRTL is the message name, the PRODUCT indicates the product type, e.g., V=Vnet, C=CVNS, S=Vision, T=toll free, F=Traffic view, etc. DATATYPE indicates the data type, e.g. R=reports, D=call detail, etc., and DATACAT represents the report category, e.g., P=priced, U=unpriced.

In the hereinafter described manner, the GRTL message is received by the StarWRS proxy server application 250' to enable the RM server 250 to perform the query into the RM Informix database having the data associated with the request. Specifically, after selecting the Report Requester from the browser or the Toolbar, a WRSApp object is launched. At its creation, the WRSApp object creates a DataManager object to guide the data and which initiates a CommunicationManager object to manage all communication between the client and the server. The CommunicationManager utilizes a RptManagerMsg object to create: 1) a GRTL; 2) a WRSCommWrapper for direct communication with the backend; and, 3) a WRSReportManagerUtilParser to format the data returned. In response, the Report Manager creates a Dispatcher object, which contains the business logic for handling metadata messages at the back-end and utilizes the services of a RMParser class. Upon determining that the client has sent a valid message, the appropriate member function is invoked to service the request. Upon receiving the message, the Report Manager creates the Parser object (RMParser) which takes the message apart and invokes a validation object which validates the message.

In response to the GRTL message, the data returned by the Report Manager server 250 for this particular request may include the following data in metadata format as follows:
SRTL<ERROR=0, REPORTS=<RptCategoryDescription1 =<RptTitle1.1, RptTemplateID1.1, RptCategoryType1.1>, <RptTitle1.2, RptTemplateID1.2, RptCategoryType1.2>>, <RptCategoryDescription2=<RptTitle2.1, RptTemplateID2.1, RptCategoryType2.1>, <RptTitle2.2, RptTemplateID2.2, RptCategoryType2.2>>, . . . <RptCategoryDescription#n=<RptTitle#n.n, RptTemplateID#n.n, RptCategoryType#n.n>, <RptTitle#n.n, RptTemplateID#n.n, RptCategoryType#n.n>>> wherein RptID# indicates a standard report template ID, RptTitle# indicates the standard report template title, Rptcategory# indicates the report category, e.g. Monitor Usage, Analysis Traffic, Historical, Executive Summary, Call Detail, etc.; and, RptDescript indicates the standard report template description displayed to the user. Thus, for each Report Template Category, there will be the list of reports with each entry containing a Report Template Title, a Report Template Description and the Report Template ID.

The SRTL message is sent from the StarWRS RM proxy server to the report requestor for presentation to the customer. Specifically, the SRTL response is built inside the esql wrapper function after obtaining the necessary information through the stored procedure from the Report Manager Informix database. The Report Manager creates the RMServerSocket object and sends the SRTL message back to the client.

To retrieve details of the standard report template, the GRTD request message request is sent having content shown in the table in Appendix A. When specified, the Report ID field indicates an existing report that a user may wish to edit.

The SRTD response generated by the RM server is formatted in metadata as follows:
<Report Template ID=ID#,
NODE1=<node level1, label value1, assigned unique screen identification1, >,
NODE2=<node level2, label value2, assigned unique screen identification2, <control ID2.1, field value2.1, data location2.1>, <control ID2.2, field value2.2, data location2.2>, < . . , . . . , . . >>,
NODE#n=<node level#n, label value#n, assigned unique screen identification#n, <control ID#n.1, field value#n.1, data location#n.1>, <control ID#n.2, field value#n.2, data location#n.2>>

In the SRTD message, the MetaTreeData Label fields include such values as General, Report Name, Report Description, Scheduled Execution, etc. The MetaCtrlInfo MetaField Value fields may be blank or may contain the selection options available to the user. This information is taken from the report template database.

As another example, when a report request is submitted to retrieve a full list of user created reports from a user report table, i.e., a template list for a particular report product, category, and type, the example metadata format is as follows:
GURL<USERID=jeanvnet2,RPTTMPID=1,EN-TPID=00022924,PRODUCT=T,DATACAT=U> with UserID and ReportTemplateID fields specified. Specifically, this process entails invoking the Communication Manager object to communicate with the RM server in order to obtain a SURL metadata message. The CommunicationManager utilizes the RptManagerMsg object to create: 1) a GURL, 2) a WRSCommWrapper for direct communication with the backend, and, 3) a WRSReportManagerUtilParser to format the data returned. The parser returns a hash table containing the User Report List. At the RM server, the Report Manager creates an Dispatcher object that contains the business logic for handling metadata messages at the back-end and utilizes the services of the RMParser class. Upon determining that the client has sent a valid message, the appropriate member function is invoked to service the request. The Report Manager, upon receiving a message, creates a Parser object (RMParser) which takes the message apart and invokes a validation object which validates the message.

In response to the GURL request, the data returned is taken from a user report table in the RM server database. The generic SURL message in Metadata format returned by the RM server 250 includes the following information:
REPORTS=<UserRptCategory1=<UserRptTitle1, UserRptID1, activeflag, report type, statusdate>>, <UserRptCategory2=<UserRptTitle2, UserRptID2, activeflag, report type, statusdate>>, . . . <UserRptCategory#n=<UserRptTitle#n, UserRptID#n, activeflag, report type, statusdate>>> wherein for each user report category, there is a list of reports where each entry contains a UserRptID# indicating a user-defined report template ID, a UserRptTitle# indicating the user's report template title, and a UserRptCategory# indicating the user report category. Specifically, the SURL response is built inside an esql wrapper function after obtaining the necessary information through a stored procedure from the Informix database. The Report Manager creates the RMServerSocket object and sends the SURL message back to the client.

To retrieve the details of a specific user's report, the GURD message is sent having data as contained in the table shown in Appendix A. Specifically, when the user selects a report from the Inventory List on the Report Requestor, a Communication Manager object is invoked to communicate with the RM server in order to obtain a SURD metadata message. The CommunicationManager object first utilizes the RptManagerMsg object to create: 1) a GURD metadata message, 2) a WRSCommWrapper for direct communication with the backend, and 3) the RSReportManagerUtilParser to format the data returned. The parser organizes the data into a series of nodes which are utilized to create the report builder tree on the report requester customization screen. Later this data will be extracted from the node and used to construct the screen related to the node. The Report Manager server creates the MCIDispatcher object which contains the business logic for handling metadata messages at the back-end and utilizes the services of the RMParser class. Upon determining that the client has sent a valid message, the appropriate member function is invoked to service the request. The Report Manager, upon receiving a message, creates the Parser object (RMParser) which takes the message apart, invokes a validation object which validates the message and builds a response inside the esql wrapper function after obtaining the necessary information through the stored procedure from the Informix database. The Report Manager creates the RMServerSocket object and sends the SURD/SRTD message back to the client. The responsive SURD metadata message corresponding to a retrieve user report detail (GURD) request has the following metadata syntax:
<Report Template ID=ID#,
NODE1=<node level1, label value1, assigned unique screen identification1, >,
NODE2=<node level2, label value2, assigned unique screen identification2, <control ID2.1, field value2.1, data location2.1>, <control ID2.2, field value2.2, data location2.2>, < . . , . . , . . >>,
NODE#n=<node level#n, label value#n, assigned unique screen identification#n, <control ID#n.1, field value#n.1, data location#n.1>, <control ID#n.2, field value#n.2, data location#n.2>, < . . , . . , . . >>, This response thus may include the report information having detailed items including: UserReportID (UserID), User's report name (UserName), product (UserProd), Threshold (UserThreshold), User Report Description (UserDescript), Report Columns (UserFields), Report column headings (UserHeaders), and, in addition, customization options with fields indicating, inter alia, columns to display (UserHeaders), user-defined criteria (UserCriteria), a sort order (UserOrder) and scheduling selections (UserSched), the last update of this report (UserLastUpdate) and, the Report status (if adhoc) (UserStatus), etc.

If a request is made to add a user-created report to a User_report table maintained by the RM Server 250, the ARD metadata message having fields defined in the table provided in Appendix A is processed by the RM server 250. An example message in metadata format to initiate the addition of a user-created report for TVS Inbound data is as follows:
ARD<USERID=jeanvnet2,ENTPID=00022924,STDRP-TID=75,NAME=
Payphone Summary TVS Inbound,PRODUCT=T, CATEGORY=Standard
Report,THRESHOLD=<>,
SCHEDULE=A<START=199808010000,END=19 9808111200>,RANGETYPE=1,SCHEDTYPE=A,TIMEZONE=45,NDIALED=
<8886520001~8886520002>,DESCRIPTION=Summarizes Payphone
Calls by Toll Free Number,ACTIVE=1,
MMADDR=jean.jerzak@mci.com,MMTEXT=Message is in,PGT=a,PGPIN=000000,PGTXT=654654654,
EMAIL=1,PAGE=1,
LANG=1234, CURR=2345>

An example message in metadata format to initiate the addition of a user-created report for TVS Outbound data is as follows:
ARD<USERID=jeanvnet2,ENTPID=00022924,STDRP-TID=76,
NAME=Outbound Traffic CallDetail,PRODUCT=V, CATEGORY=Call Detail,THRESHOLD=<>,
SCHEDULE=D<>,
SCHEDTYPE=R,TIMEZONE=45,
BILLING=NODE<<22924,PRS UAT MASTER>>NODE<<22926,PRS FUTURE RELEASE C HQ>>NODE
<<22927,PRS FUTURE RELEASE A HQ>>NODE<<22928,5/92
RELEASE HQ>>NODE<<22929,PRS FUTURE RELEASE B
HQ>>NODE<<22940,PRS FUTURE RELEASE DHQ>>NODE<<25702, 91000012CNA NAME>>,OACCESS=<2~13>, DESCRIPTION=Outbound
traffic call detail.,
COLUMNS=<44~67~62~36~61~58~63~64~66~65>,ACTIVE=1,PGT=b,P
GPIN=3342423,PGTXT=Your report is ready!,EMAIL=0, PAGE=1, LANG=1234,CURR=2345>

In these examples, the "NAME" field refers to the Report Name (e.g., city summary); the "PRODUCT" field refers to the report product (Vision); the "THRESHOLD" field refers to the record count; the "DESCRIPTION" field refers to the report description; the "COLUMNS" refers to the number of columns specified for a report by the user; the "BILLING" field refers to the specified report billing entitlement, i.e., billing hierarchy; the "IACCESS" field refers to the inbound access type and the "OACCESS" refers to the outbound access; the "SORTBY" field indicates the report column sorting customization with "A" indicating column(s) having data to be sorted in ascending order and, "D" indicating column(s) having data to be sorted in descending order; the "SCHEDULE" field referring to the scheduling type, e.g., with "A" indicating an ad-hoc report, and the user specified date range on which to report as indicated by the "START" and "END" fields, and additionally, the scheduling frequency information in the case of a recurring report; the SUBTOTALCOLUMNS field, referring to the report columns having data to be subtotaled; and, the "EMAIL" and "PAGE" fields indicating reporting notification via e-mail or paging, respectively.

Furthermore, for each of the metadata messages in Appendix A, including the Delete Report Definition (DRD), copy report definition (CRD), and update report scheduling (URS) messages, the report manager server 250 responds to the Report Requestor with the processing results. In the case of a copy report, a new User Report ID is assigned and returned by RM. When editing an existing report, e.g., a TVS (traffic) or StarODS (priced call data) report, the user may make changes to the Report Title, the Report Description, the Report scheduling, the 800 numbers and thresholds. For StarODS priced call data reports, customers may provide additional customization options including: number of rows, report columns, access codes, access types, billing location, geographic location, paging notification, and e-mail notification. More specifically, when the user selects a report from the inventory list or a new report, an WRSEdit Screen is launched to provide the editing capabilities which are available for the report format. WRSedit guides the screens through the process of retrieving the screens' data. Some of the screens need data which has not yet been retrieved, such as 800 numbers or geographic locations. These screens manage the requests to the DataManager object to create the get pick list (GPL) message (Appendix A), which launches the CommunicationManager object to perform this task.

The CommunicationManager utilizes the RptManagerMsg object to create the GPL, the WRSCommWrapper for direct communication with the backend, and the WRSReportManagerUtilParser to format the data returned. In response, the Report Manager server creates the MCIDispatcher object and invokes the MCIRMParser class. Upon determining that the client has sent a valid message, the appropriate member function is invoked to service the request. The Report Manager, upon receiving a message, creates the Parser object (RMParser) which takes the message apart and a validation object is invoked which validates the message. The response is built inside the esql wrapper function after obtaining the necessary information through the stored procedure from the Informix database. The Report Manager creates the RMServerSocket object and sends the GPLA message back to the client.

Figures 12C, 12D:
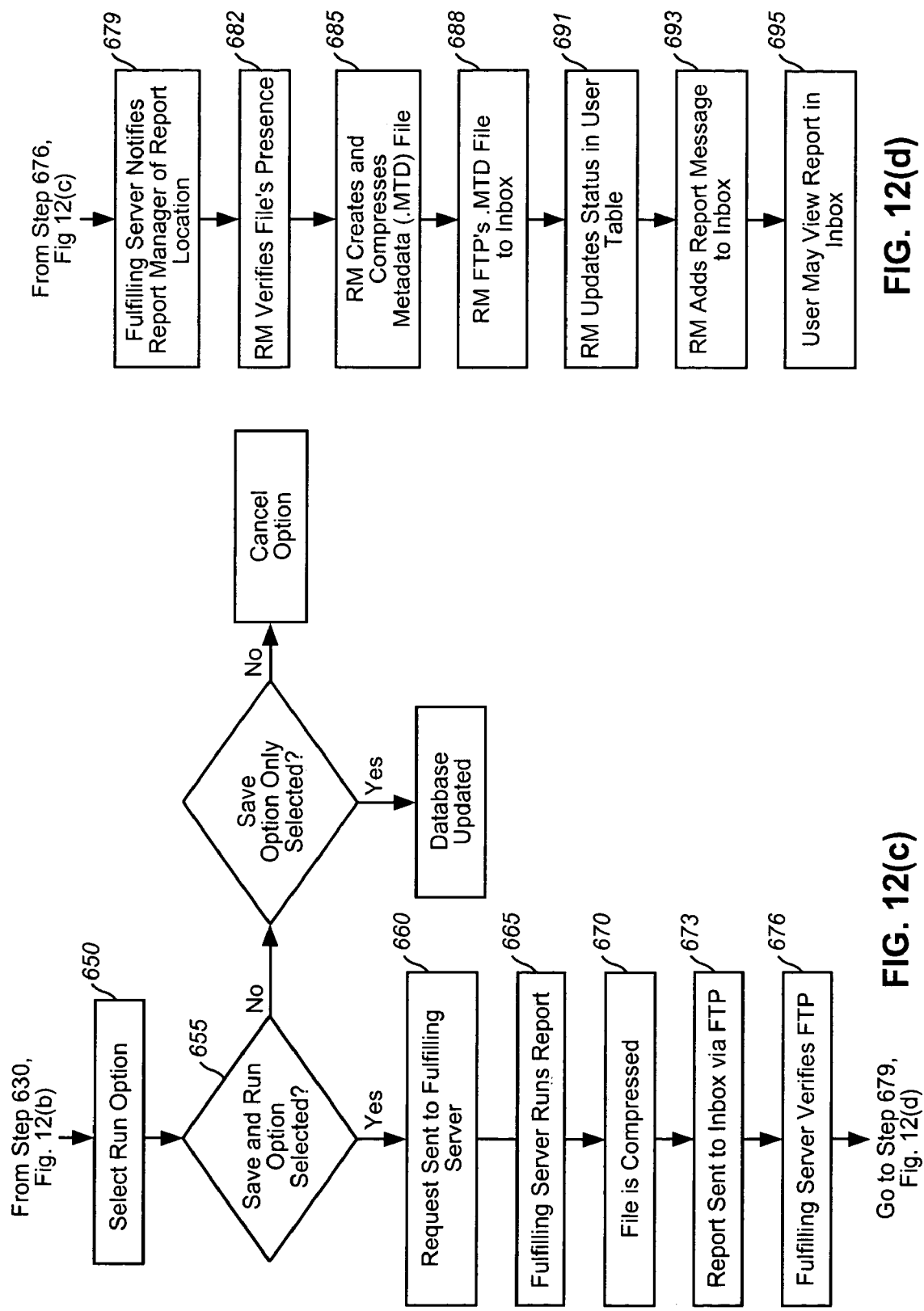

Having described the functionality of selecting and/or generating a report and customizing it, reference is now had to FIG. 12(c) which describes the next step 650 of presenting the user with report run and save options. Particularly, in the preferred embodiment, the user may select a save and exit report option, or a save and run report option. In either scenario, an WRSEdit object enables a WRSScnMgr object to save the report to the RM server. The WRSScnMgr object launches each screens save method which communicates with the DataManager object to place the screens data in its corresponding WRSNode. Once all of the WRSNode objects have been updated, the WRSScnMgr object calls the DataManager object's SaveReport method to build a hash table to contain all of the report's data. The CommunicationManager utilizes the RptManagerMsg object to create the ARD metadata message from the hash table, the WRSCommWrapper for direct communication with the backend, and the WRSReportManagerUtilParser to handle any errors thrown by the server. The Report Manager creates the Dispatcher object, and utilizes the services of the RMParser class and validation objects. Upon determining that the client has sent a valid message, the appropriate member function is invoked to service the request. The response is built inside the esql wrapper function after obtaining the necessary information through the stored procedure from the RM database. The Report Manager creates the RMServerSocket object and sends the ARDA message back to the client. When a report is submitted the selected report type and reporting criteria are sent to the Report Manager.

As illustrated in FIG. 12(c), at step 655, in reference to user selection of a Save and Run report option, the report is marked as scheduled and saved in a user_table in the Report Scheduler server 260 via the report Manager. Subsequently, as indicated at step 660, the Report Scheduler server 260 sends the ARD message to the fulfilling server which queues the report and runs the report at the specified time(s), as indicated at step 665, and as described herein with reference to FIG. 11.

Generally, whether the report is to be currently run for immediate ad hoc reporting, or, is scheduled for normal scheduled reporting, the following sequence of operations, as indicated at steps 670–695, FIGS. 12(c)–21(d), are performed: First, in response to receipt of the ARD message, e.g., submitted to the fulfilling server by the Report Scheduler, the fulfilling server completes the report and compresses the report/data, as indicated at step 670. Then, the report/data is "pushed", implementing FTP, to the fulfilling server's directory on the Inbox server 270, as indicated at step 673. The TVS server 550, is responsible for generating unique file names within their directory on the Inbox server 270. For example, the following directory and file naming conventions used for reports generated by the TrafficView server are labeled inbox\files\TVs with text files having the suffix *.txt or *.txt_zip (compressed), and comma separated files having a suffix *.csv or *.csv_zip (compressed). The fulfilling server then verifies that the FTP process was successful, as indicated at step 676, and, at step 679, a notification is sent by the fulfilling server to the Report Manager to notify the Report Manager server 250 of the location of a scheduled report. This is accomplished by using a "NRL" metadata message.

Appendix B provides a table comprising the Notify Report Location parameters used for the NRL Metadata messaging sent by a fulfilling server to the RM Server 250 when a requested report is complete. An example NRL message sent from the TVS server 500 to the RM server 250 is as follows:
NRL<TYPE=traffic, ENTPID=00022924, USERID=jeanvnet2,
STDRPTID=25,USERRPTID=699, REQUESTID=32185, COMPRESS=0,
LOC=/inbox/files/TVS/902507996STDRPTID25.CSV, file, but having the following suffix: *.mtd or *.mtd_zip indicating a metadata or compressed metadata file, respectively.

Appendix F details the parameters that are passed in the GET METADATA messaging for indicating to the Report Viewer how to display a requested report. For example, a GET METADATA message corresponding to an unpriced TVS fulfilling server report is as follows:
<METADATA=<CRITERIA=<Name=UsageSummary292
^ADescription=
This report summarizes calls based on call type.^A
Report_Level=<INBOUND<<90000001,90000001><NA, NA><NA,NA>>
INBOUND<<90000002,90000002><,><, >>>^AOptions=^AScheduling
_Information=^AOne_Time=^ADates=<06/01/199800:00/ ~07/01/1
99800:00,>^ATimezone=EST,Lang=1234, Curr=2345>DEFAULT_GRAP
H_MODE=0^ADEFAULT_GRAPH_TYPE=0^ ADEFINE_X_AXIS=0
^AX_AXIS_COLUMN=^ADEFAUL T_Y_COLUMNS=<>^A
COLUMN_DISPLAY_ORDER=<105^A114^A67^A62^ A36^A61^A58^A63^A6
4^A66^A65>^ASORT_ALLOWED=1^APRESORTED=0^A PRESUBTOTALED=1^ATOTALMODE= 0^ASORT-_COLUMN S=<105A>^A
SUBTOTAL_COLUMNS=<>^ASELECTED_SECTION= 1^A
METACOLUMN=<META_COLUMN_ID=105^A
COLUMN_LABEL=Usage Description^ADATATYPE=S^ADECIMAL=1^A
HIDEABLE=1^AGRAPHABLE=1^AWIDTH=20^ ACALCULATE=1^A
CALCULATE_EXPRESSION=>^AMETACOLUMN= <META_COLUMN_ID=114^A
COLUMN_LABEL=Range/ DistanceDescription^ADATATYPE=S^ADECIMAL=0^A
AL=0^AHIDEABLE=1^AGRAPHABLE=0^AWIDTH= 20^ACALCULATE=0^A
CALCULATE_EXPRESSION=>^AMETACOLUMN=< META_COLUMN_ID=67^A
COLUMN_LABEL=CallS^ADATATYPE=1^ADECIMAL =0^AHIDEABLE=1^A
GRAPHABLE=1^AWIDTH=7^ACALCULATE=0^ ACAL-CULATE_EXPRESSION=>
^AMETACOLUMN=<META_COLUMN_ID=62^ ACOL-UMN_LABEL=% CallS^A
DATATYPE=N^ADECIMAL=1^AHIDEABLE=1^ AGRAPHABLE=1^AWIDTH=7^A
CALCULATE=0^ACALCULATE_EXPRESSION=>^A
METACOLUMN=<META_COLUMN_ID=36^A COLUMN_LABEL=Minutes^A
DATATYPE=N^ADECIMAL=1^AHIDEABLE=1^ AGRAPHABLE=1^AWIDTH=8^A
CALCULATE=0^ACALCULATE_EXPRESSION=>^A METACOLUMN=<META_COLUMN_ID=61^ ACOL-UMN_LABEL=% Min^A
DATATYPE=N^ADECIMAL=1^AHIDEABLE=1^ AGRAPHABLE=1^A
WIDTH=5^ACALCULATE=0^ACALCULATE_ EXPRESSION=>^A
METACOLUMN=<META_COLUMN_ID=58^ ACOLUMN_LABEL=Amount^ADATAT
YPE=C^ADECIMAL=2^AHIDEABLE=1^A
GRAPHABLE=1^AWIDTH=7^ACALCULATE=0^ ACAL-CULATE_EXPRESSION=>
^AMETACOLUMN=<META_COLUMN_ID=63^ ACOL-UMN_LABEL=% Amt^A
DATATYPE=N^ADECIMAL=1^AHIDEABLE=1^ AGRAPHABLE=1^AWIDTH=5^A
CALCULATE=0^ACALCULATE_EXPRESSION=>^A
METACOLUMN=<META_COLUMN_ID=64^ ACOLUMN_LABEL=Avg Min/Call
^ADATATYPE=N^ADECIMAL=2^AHIDEABLE= 1^AGRAPHABLE=1^A
WIDTH=12^ACALCULATE=0^ACALCULATE_ EXPRESSION=>^A
METACOLUMN=<META_COLUMN_ID=66^ ACOLUMN_LABEL=Avg
Amt/Call^A
DATATYPE=N^ADECIMAL=2^AHIDEABLE=1^ AGRAPHABLE=1^AWIDTH=12
^A CALCULATE=0^ACALCULATE_EXPRESSION=>^A
METACOLUMN=<META_COLUMN_ID=65^ ACOLUMN_LABEL=Avg Amt/Min^A
DATATYPE=N^ADECIMAL=2^AHIDEABLE= 1^AGRAPHABLE=1^A
WIDTH=11^ACALCULATE=0^ACALCULATE_ EXPRESSION=>>>
*<METADATA=<CRITERIA=<Name=My Report, Total=Totals
are located at the bottom of the report.,
Description=My report description,
Number Dialed=<800#1, 800#2, 800#n>,
Scheduling Information=Recurring, Dates=Monthly>>
DEFAULT_GRAPH_MODE=1, DEFAULT_GRAPH-_TYPE=1,
DEFINE_X_AXIS=1, X_AXIS_COLUMN=2,
DEFAULT_Y_COLUMNS=<5,6>,
COLUMN_DISPLAY_ORDER=<1,2,3,4,5,6>,
COLUMN_STORED_ORDER=<4,3,2,5,6,1>, SORT_ALLOWED=1,
PRESORTED=1, TOTALMODE=3, SUBTOTCOL=<5,6>, SELECTED
SECTION=1, METACOLUMN=<META_COLUMN ID=1,
COLUMN_LABEL=name, DATATYPE=S, DECIMAL=0, HIDEABLE=1,
GRAPHABLE=0, WIDTH=10, CALCULATE=1,
CALCULATE_EXPRESSION=<4/7>>>>

Once the metadata file corresponding to the requested report is build by the Report Manager, the RM ftp's the .MTD file to the Inbox server, as indicated at step 688, FIG. 12(*d*). The RM server additionally updates the User_report table status field with a status "C" indicating completion, as indicated at step 691.

Once the Report Manager has updated the status field, the RM server 250 then adds the report to the user's Inbox, as indicated at step 693.

Appendix C provides a table showing the fields for the metadata messaging between the RM server 250 and the Inbox server 270 for adding an item into the StarWRS system Inbox server 270, and the respective acknowledgment message format from the Inbox server. In the "A" message found in Appendix C, the "LOC" field includes information about where the report data is located. For example, a metadata message indicating to the Inbox server that an unpriced TVS fulfilling server report is available is shown as:

A<CATEGROY=R, TYPE=traffic,REQUESTID=32197, USERID=LynneLevy2, RPTID=150, PRIORITY=,COMPRESS=0,
UNOTIFY=0,MMADDR=,MMTEXT=,PGT=,PGPIN=, PGTXT=,
RPTCATEGORY=Service Location & Hour,
LOC=/inbox/files/testTVS/
  9025112294STDRPTID10.CSV,ENTPID
=10324488,RQSTDT=1998-01-02
15:18, FSIZE=3705,RPTTITLE=Summary by Service Location and
Hour,MSIZE=3322>

Particularly, the RM server supplies a metadata "A" message to the Inbox indicating the FTP file location. Via the report viewer, the report is now available for viewing, downloading, saving, or printing by the user, as indicated at step 695, and as described in further detail in co-pending U.S. patent application Ser. No. 09/159,512, now U.S. Pat. No. 6,385,644, entitled MULTI-THREADED WEB BASED IN-BOX FOR REPORT MANAGEMENT, the contents and disclosure of which are incorporated by reference as if fully set forth herein. Particularly, as shown in the exemplary nMCI home page in FIG. 4, the NMCI Interact Message Center icon 77 may be selected which will cause the display of a web page including the message center dialog window. From the message center dialog window, a user may select from among three tabs, one of which, a reports tab, enables the retrieval of both a data file and a metadata file from the Inbox Server corresponding to those reports that have been run and available for customer viewing. Information provided for display by the message center display 325 is provided by the User_table which keeps track of the status of all reports for a particular user. By double-clicking a chosen report, a report viewer application is enabled to display the chosen report on a web-page.

Referring back to FIG. 6, the Report Viewer 215 interfaces with the user's Inbox 210 for presenting to the customer the various type of reports received at the Inbox. It should be understood that all Report Requestor and Report Viewer applications communicate with the RM server 250 through the use of the common object communication classes.

Particularly, as shown in FIG. 6, the Inbox server 270 interface with the Inbox Client 210 supports messaging that enables the User to remove an item from the Inbox, e.g., delete a report, or, to delete all items from the Inbox, e.g., for a particular Enterprise and User ID as well as other associated reports.

Appendix G illustrates the parameters used in the metadata messaging between the Inbox client and the Inbox server. Particularly, the List "L" message is a synchronous request for a list of all Inbox items for a specific user. The Inbox fetch "F" function is a bulk transfer request that enables bulk transfer of the requested file to the Inbox client.

Referring back to FIG. 12(*b*), after editing or modifying an existing report, the user may simply select to save the report and exit. In this case, the ARD message is sent from the Report Requestor client to the RM server and is saved in the RM inventory database for subsequent execution. Consequently, the report is flagged as incomplete in the User_table and may not be run until a run option for that report is chosen. Otherwise, the report may be immediately scheduled if the user selects the save and run button.

As described, Metadata messaging is used throughout the various components of the StarWRS system 200. The format of an interface message that is sent to the Report Scheduler server is identical to the format as shown in Table 3 as is the interface messaging format returned by the RS server 260 in Table 2. Thus, in the case of automatic recurring reports, a variation of the process outlined in FIG. 12(*c*) occurs at step 660, whereby the ARD request is instead sent from the report scheduler to the fulfilling server at the programmed frequency. Particularly, when a report is required to be run, the Report scheduler server 260 (FIG. 6) sends an ARD request to the fulfilling server in a metadata message format having parameters as included in the Add Report Definition table in Appendix D. Upon processing of the metadata message, the fulfilling server will respond to the report Scheduler with an acknowledgment of the command, and the process outlined in FIGS. 12(*c*) and 12(*d*) is executed.

Figure 13:
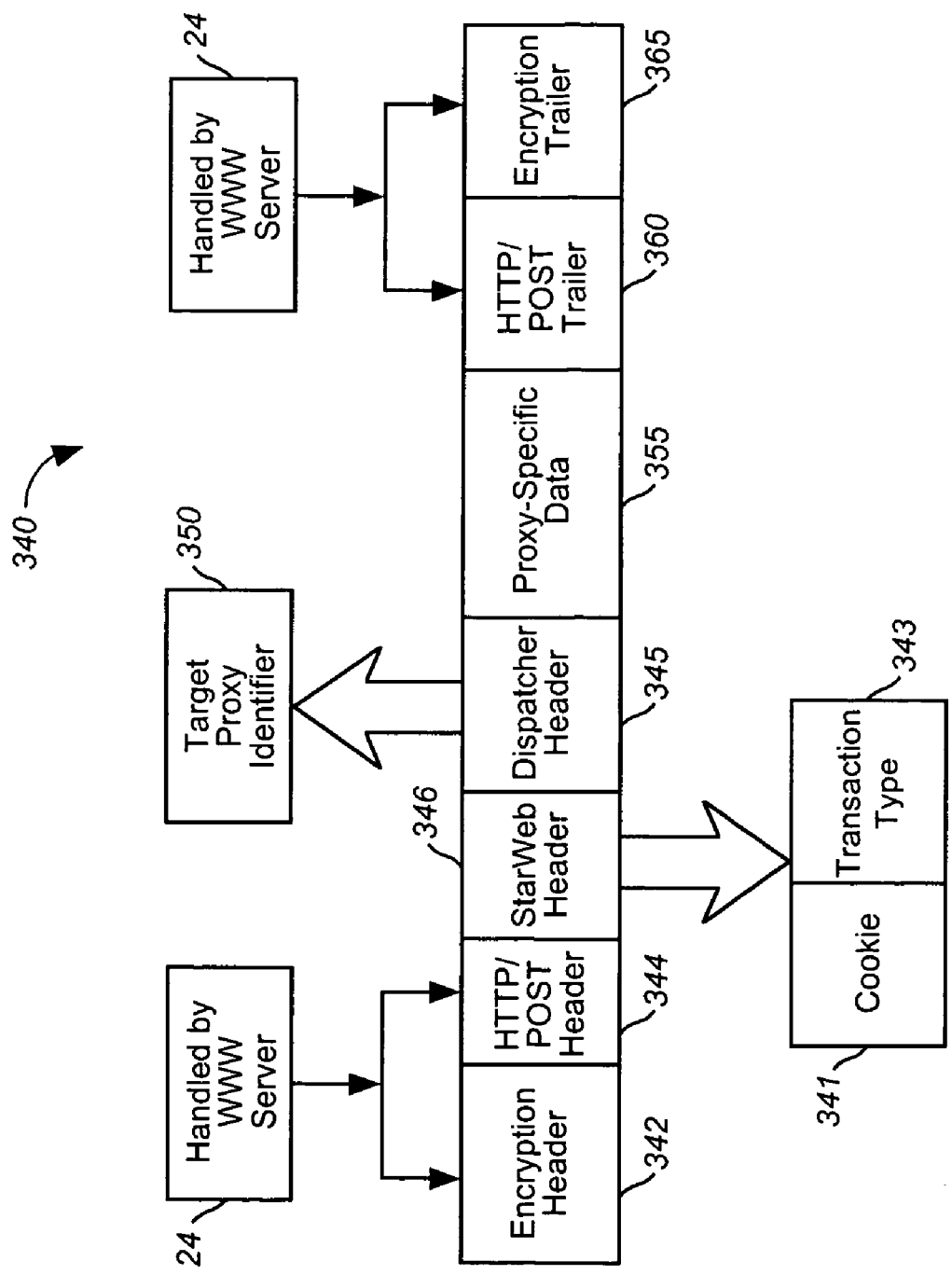
FIG. 13 illustrates a logical message format sent from the client browser to the desired middle tier server for a particular application; and, FIGS. 14(a) and 14(b) are schematic illustrations showing the message format passed between the Dispatcher server and the application specific proxy (FIG. 14(a)) and the message format passed between the application specific proxy back to the Dispatcher server (FIG. 14(b)).

As mentioned herein with respect to FIG. 2, the messages created by the client Java software are transmitted to the StarWeb (DMZ) Server 24 over HTTPS. For incoming (client-to-server) communications, the DMZ Web servers 24 decrypt a request, authenticate and verify the session information. The logical message format from the client to the Web server is shown as follows:

| TCP/IP encryption | http | web header | dispatcher header | proxy-specific data | where "|" separates a logical protocol level, and protocols are nested from left to right. FIG. 13 illustrates a specific message sent from the client browser to the desired middle tier server for the particular application. As shown in FIG. 13, the client message 340 includes an SSL encryption header 342 and a network-level protocol HTTP/POST header 344 which are decrypted by the DMZ STarWeb Server(s) 24 to access the underlying message; a DMZ Web header 346 which is used to generate a cookie 341 and transaction type identifier 343 for managing the client/server session; a dispatcher header 345 which includes the target proxy identifier 350 associated with the particular type of transaction requested; proxy specific data 355 including the application specific metadata utilized by the target proxy to form the particular messages for the particular middle tier server providing a service; and, the network-level HTTP/POST trailer 360 and encryption trailer 365 which are also decrypted by the DMZ Web server layer 24.

After establishing that the request has come from a valid user and mapping the request to its associated session, the request is then forwarded through the firewall 25 over a socket connection 23 to one or more decode/dispatch servers 26 located within the corporate Intranet 30. The messaging sent to the Dispatcher will include the user identifier and session information, the target proxy identifier, and the proxy specific data. The decode/dispatch server 26 authenticates the user's access to the desired middle-tier service.

As shown in FIG. 13, the StarWeb server forwards the Dispatcher header and proxy-specific data to the Dispatcher, "enriched" with the identity of the user (and any other session-related information) as provided by the session data/cookie mapping, the target proxy identifier and the proxy-specific data. The dispatch server 26 receives the requests forwarded by the Web server(s) 24 and dispatches them to the appropriate application server proxies. Particularly, as explained above with respect to FIG. 6, the dispatch server 26 receives request messages forwarded by the DMZ Web servers and dispatches them to the appropriate server proxies. The message wrappers are examined, revealing the user and the target middle-tier service for the request.

A first-level validation is performed, making sure that the user is entitled to communicate with the desired service. The user's entitlements in this regard are fetched by the dispatch server from Order Entry server 280 at logon time and cached. Assuming that the Requestor is authorized to communicate with the target service, the message is then forwarded to the desired service's proxy, which, in the accordance with the principles described herein, comprises: 1) a report manager proxy 250' corresponding to the RM Server 250, 2) a report scheduler proxy 260' corresponding to the RS Server 260, and 3) an inbox server proxy 270' corresponding to the Inbox Server 270. Each of these proxy processes further performs: a validation process for examining incoming requests and confirming that they include validly formatted messages for the service with acceptable parameters; a translation process for translating a message into an underlying message or networking protocol; and, a management process for managing the communication of the specific customer request with the middle-tier server to actually get the request serviced. Data returned from the middle-tier server is translated back to client format, if necessary, and returned to the dispatch server as a response to the request.

Figure 14A:
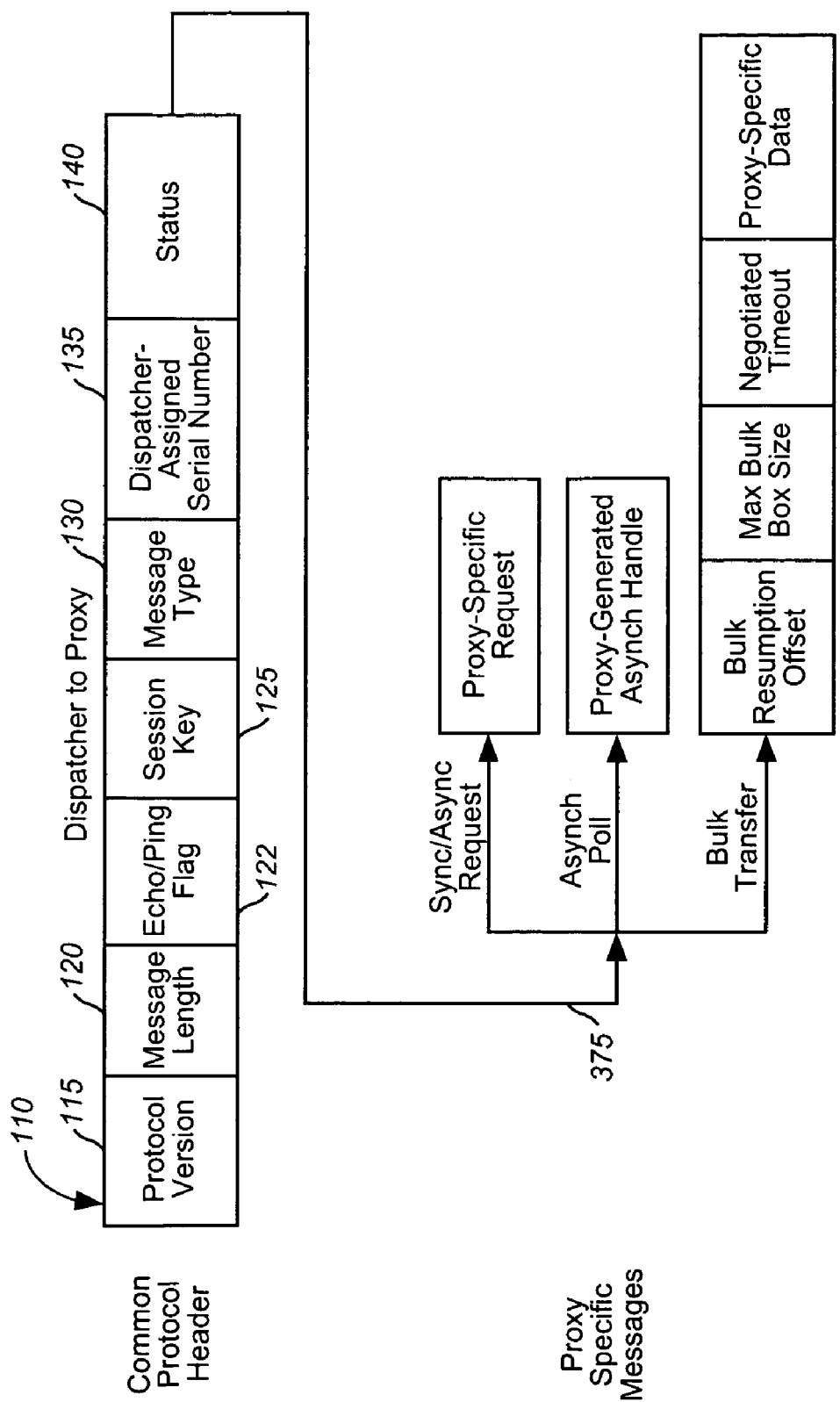
Figure 14B:
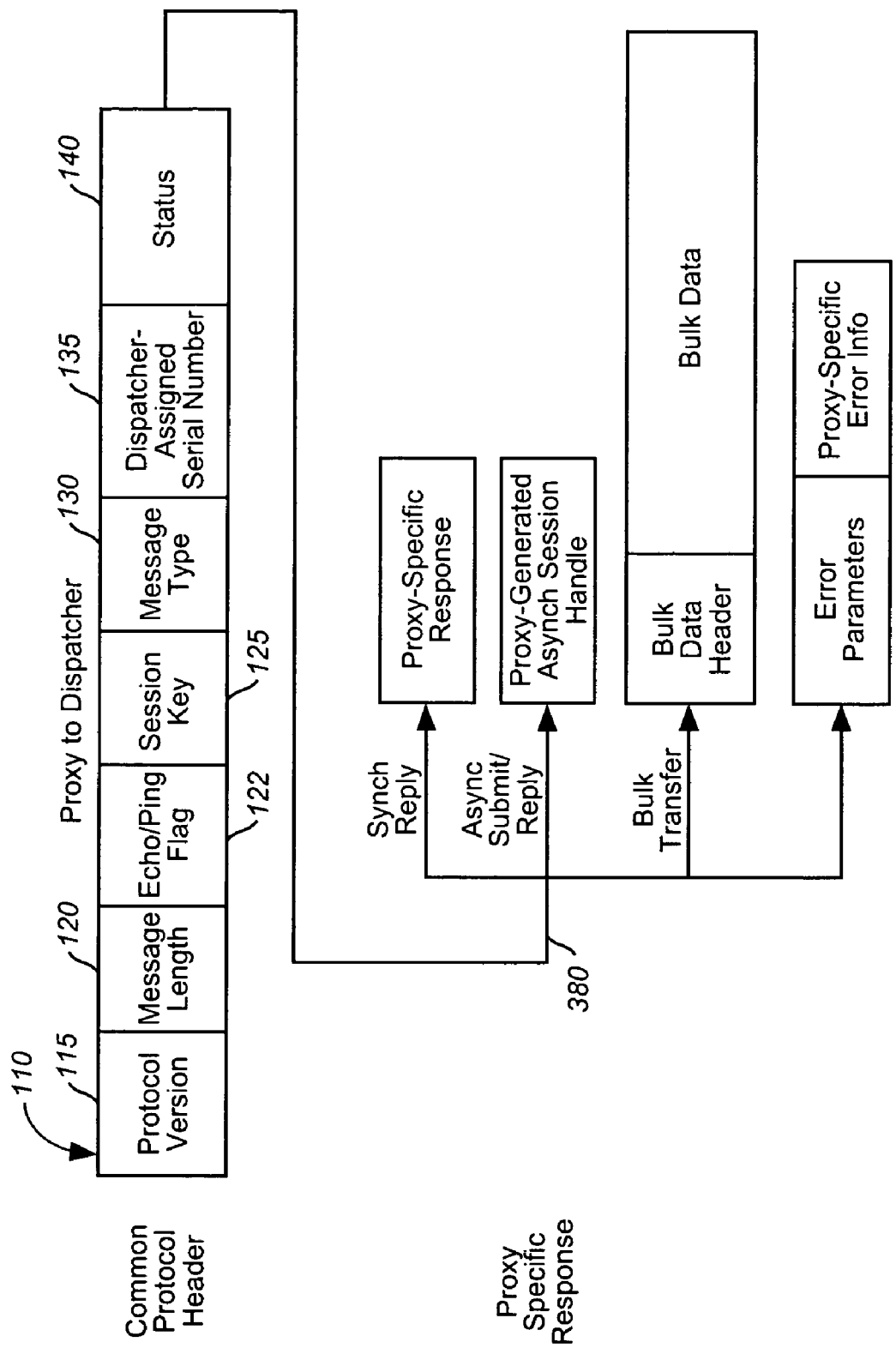

FIGS. 14(*a*) and 14(*b*) are schematic illustrations showing the message format passed between the Dispatcher 26 and the application specific proxy (FIG. 14(*a*)) and the message format passed between the application specific proxy back to the Dispatcher 26 (FIG. 14(*b*)). As shown in FIG. 14(*a*), all messages between the Dispatcher and the proxies, in both directions, begin with a common header 110 to allow leverage of common code for processing the messages. A first portion of the header includes the protocol version 115 which may comprise a byte of data for identifying version control for the protocol, i.e., the message format itself, and is intended to prevent undesired mismatches in versions of the dispatcher and proxies. The next portion includes the message length 120 which, preferably, is a 32-bit integer providing the total length of the message including all headers. Next is the echo/ping flag portion 122 that is intended to support a connectivity test for the dispatcher-proxy connection. For example, when this flag is non-zero, the proxy immediately replies with an echo of the supplied header. There should be no attempt to connect to processes outside the proxy, e.g. the back-end application services. The next portion indicates the Session key 125 which is the unique session key or "cookie" provided by the Web browser and used to uniquely identify the session at the browser. As described above, since the communications middleware is capable of supporting four types of transport mechanisms, the next portion of the common protocol header indicates the message type/mechanism 130 which may be one of four values indicating one of the following four message mechanisms and types: 1)Synchronous transaction, e.g., a binary 0; 2) Asynchronous request, e.g., a binary 1; 3) Asynchronous poll/reply, e.g., a binary 2; 4) bulk transfer, e.g., a binary 3.

Additionally, the common protocol header section includes an indication of dispatcher-assigned serial number 135 that is unique across all dispatcher processes and needs to be coordinated across processes (like the Web cookie (see above)), and, further, is used to allow for failover and process migration and enable multiplexing control between the proxies and dispatcher, if desired. A field 140 indicates the status is unused in the request header but is used in the response header to indicate the success or failure of the requested transaction. More complete error data will be included in the specific error message returned. The status field 140 is included to maintain consistency between requests and replies. As shown in FIG. 14(*a*), the proxy specific messages 375 are the metadata message requests from the report requester client and can be transmitted via synchronous, asynchronous or bulk transfer mechanisms. Likewise, the proxy specific responses are metadata response messages 380 again, capable of being transmitted via a synch, asynch or bulk transfer transport mechanism.

It should be understood that the application server proxies can either reside on the dispatch server 26 itself, or, preferably, can be resident on the middle-tier application server, i.e., the dispatcher front end code can locate proxies resident on other servers.

As mentioned, the proxy validation process includes parsing incoming requests, analyzing them, and confirming that they include validly formatted messages for the service with acceptable parameters. If necessary, the message is translated into an underlying message or networking protocol. A list of Report Manager and Inbox proxy error messages can be found in Appendix E. If no errors are found, the proxy then manages the communication with the middle-tier server to actually get the request serviced. The application proxy supports application specific translation and communication with the back-end application server for both the Web Server (java applet originated) messages and application server messages.

Particularly, in performing the verification, translation and communication functions, the Report Manager server, the Report Scheduler server and Inbox server proxies each employ front end proxy C++ objects and components. For instance, a utils.c program and a C++ components library, is provided for implementing general functions/objects. Various C++ parser objects are invoked which are part of an object class used as a repository for the RM metadata and parses the string it receives. The class has a build member function which reads the string which includes the data to store. After a message is received, the parser object is created in the RMDispatcher.c object which is a file comprising the business logic for handling metadata messages at the back-end. It uses the services of an RMParser class. Upon determining that the client has sent a valid message, the appropriate member function is invoked to service the request. Invocation occurs in MCIRMServerSocket.C when an incoming message is received and is determined not to be a talarian message. RMSErverSocket.c is a class implementing the message management feature in the Report Manager server. Public inheritance is from MCIServerSocket in order to create a specific instance of this object. This object is created in the main loop and is called when a message needs to be sent and received; a Socket.c class implementing client type sockets under Unix using, e.g., TCP/IP or TCP/UDP. Socket.C is inherited by ClientSocket.C:: Socket(theSocketType, thePortNum) and ServerSocket.C:: Socket(theSocketType, thePortNum) when ClientSocket or ServerSocket is created. A ServerSocket.c class implements client type sockets under Unix using either TCP/IP or TCP/UDP. ServerSocket.C is inherited by RMServerSocket when RMServerSocket is created. An InboxParser.c class used as a repository for the RM Metadata. The class' "build" member function reads the string which includes the data to store and the class parses the string it receives. After a message has been received, the MCIInboxParser object is created in inboxutl.c which is a file comprising the functions which process the Inbox requests, i.e, Add, Delete, List, Fetch and Update. Additional objects/classes include: Environ.c which provides access to a UNIX environment; Process.c which provides a mechanism to spawn slave processes in the UNIX environment; Daemon.c for enabling a process to become a daemon; Exception.c for exception handling in C++ programs; and, RMlog.c for facilitating RM logging. In addition custom ESQL code for RM/database interface is provided which includes the ESQC C interface (Informix) stored procedures for performing the ARD, DRD, DUR, URS, GRD, CRD, and GPL messages. The functions call the stored procedures according to the message, and the response is built inside the functions depending on the returned values of the stored procedures. A mainsql.c program provides the ESQL C interface for messages from the report manager and report viewer.

Outgoing (server-to-client) communications follow the reverse route, i.e., the proxies feed responses to the decode/dispatch server and communicate them to the DMZ Web servers over the socket connection. The Web servers will forward the information to the client using SSL. The logical message format returned to the client from the middle tier service is shown as follows:
| TCP/IP | encryption | http | web response | dispatcher response | proxy-specific response | where "|" separates a logical protocol level, and protocols nested from left to right.

The foregoing merely illustrates the principles of the present invention. Those skilled in the art will be able to devise various modifications, which although not explicitly described or shown herein, embody the principles of the invention and are thus within its spirit and scope.

What is claimed is:

1. A Web/Internet based reporting system for communicating call detail information relating to traffic pertaining to a customer's telecommunications network to a client workstation via an integrated interface, said system comprising:
    client browser application located at said client workstation for enabling interactive Web based communications with said reporting system, said client workstation identified with a customer and providing said integrated interface;
    at least one secure server for managing client sessions over the internet, said secure server supporting a secure socket connection enabling encrypted communication between said browser application client and said secure server;
    a report manager server in communication with said at least one secure server for maintaining an inventory of reporting items associated with a customer, the reporting items comprising report data types and report customization features for reports to be generated for the customer;
    a data retrieval device for retrieving customer specific data from the customer's telecommunications network at pre-determined times; and,
    a requestor application enabling the customer to communicate a data report request message via said integrated interface to the report manager server, the request message being verified to ensure valid formatting,
    said request message comprising a metadata description of particular reporting items to be retrieved, said metadata description of particular reporting items being verified and forwarded to said retrieval device, and said retrieval device obtaining customer specific data in accordance with the metadata request,
    whereby said customer-specific retrieved data and said metadata description of said reporting item are communicated to said client workstation and utilized to generate a completed report for presentation to said customer, the completed report capable of being dynamically determined based on the metadata and one or more of customization options and user options.

2. The reporting system as claimed in claim 1, wherein said requester application for enabling initiation of a communication further enables presentation of a report request menu comprising user selectable reporting options for said customer report in accordance with pre-determined customer entitlements.

3. The reporting system as claimed in claim 2, wherein said requestor application further enables user selection of one or more specific reporting options for a desired report, and in response, generates said report request message for communication over a secure communications link via said at least one secure server to said report manager server.

4. The reporting system as claimed in claim 1, wherein said data retrieval device includes a process for obtaining call detail information generated from a telecommunications network switch provided within said customer's telecommunications network.

5. The reporting system as claimed in claim 4, wherein a requestor applet further enables customer scheduling of report request metadata descriptions to be communicated from said report manager to said retrieval device at a customer-specified frequency.

6. The reporting system as claimed in claim 5, wherein said secure web server further generates report requestor applets for communication over said secure communications link to said client workstation, one of said requestor applets capable of presenting said reporting items to a customer via said report requestor application.

7. The reporting system as claimed in claim 1, wherein said customer specific data information relates to a customer's telecommunication network usage at user-specified time intervals.

8. The reporting system as claimed in claim 1, wherein said customer specific data information relates to unpriced traffic call detail data.

9. The reporting system as claimed in claim 8, wherein said retrieval device includes a process for generating statistical data based on retrieved customer-specific call detail data.

10. The reporting system as claimed in claim 9, wherein said retrieval device communicates call detail data in real-time to said client workstation over said secure communication link.

11. The reporting system as claimed in claim 1, further including a report viewing device associated with said client workstation for receiving said metadata description of a requested report type and corresponding retrieved customer specific data, and generating said report for display at said interface.

12. A method for communicating call detail information relating to traffic pertaining to a customer's telecommunications network to a client workstation via an integrated interface, said method comprising:
    enabling interactive Web based communications between said client workstation identified with a customer and one or more secure servers over a secure communications link, said Web based communications including forwarding of report request messages and associated report response messages back over said secure communications link;

accessing reporting items based on a customer entitlement information for a requested report to be generated;

generating a corresponding response message including a metadata description of said reporting items for a requested report;

verifying the request message to ensure valid formatting, retrieving said customer-specific data from said customer's telecommunications network in accordance with said reporting items included in said metadata description; and generating a completed report for said customer from said metadata description of said reporting items and said retrieved customer-specific data via said integrated interface, the completed report capable of being dynamically determined based on the metadata and one or more of customization options and user options.

13. The method as claimed in claim 12, further including the step of presenting a report request menu comprising various reporting options for said customer in accordance with pre-determined customer entitlements, said reporting options including report creation and customization of said reporting items.

14. The method as claimed in claim 13, further including the step of generating a report request message in response to user selection of a specific report option for communication over said secure communications link, and communicating a response message over said communications link for display at said client workstation.

15. The method as claimed in claim 14, wherein said step of retrieving customer-specific data includes the step of polling said telecommunications network to obtain call detail records pertaining to a customer's telecommunications traffic.

16. The method as claimed in claim 15, further including the step of specifying a polling interval for retrieving customer-specific data from said telecommunications network.

17. The method as claimed in claim 16, further including the step of scheduling the generation of a report for said customer via said integrated interface, said scheduling step including storing reporting items included in a prior created metadata report description and retrieving customer-specific data for generation of a report according to the stored reporting items at the scheduled time.

18. The method as claimed in claim 17, further including generating requestor applets for communication over said secure communications link to said client workstation, one of said applets presenting reporting items to a requesting customer via said interface.

19. The method as claimed in claim 12, further including the step of supporting encrypted communication of report requested messages and report response messages between said client application and a secure server over said secure communications link.

* * * * *